(12) United States Patent
Rötzer et al.

(10) Patent No.: US 10,703,299 B2
(45) Date of Patent: Jul. 7, 2020

(54) REAR VIEW MIRROR SIMULATION

(71) Applicant: SMR Patents S.à.r.l., Luxembourg (LU)

(72) Inventors: Ilka Rötzer, Denkendorf (DE); Andreas Herrmann, Winnenden (DE); Oliver Eder, Pinache (DE); Frank Linsenmaier, Weinstadt (DE); Firas Mualla, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 46 days.

(21) Appl. No.: 15/602,068

(22) Filed: May 22, 2017

(65) Prior Publication Data

US 2018/0334108 A1    Nov. 22, 2018
US 2019/0077332 A9    Mar. 14, 2019

Related U.S. Application Data

(63) Continuation-in-part of application No. 15/287,554, filed on Oct. 6, 2016, now Pat. No. 10,395,125, and (Continued)

(30) Foreign Application Priority Data

Apr. 19, 2010   (EP) .................................... 10160325

(51) Int. Cl.
*B60R 11/04*    (2006.01)
*G06K 9/00*    (2006.01)
(Continued)

(52) U.S. Cl.
CPC ................ *B60R 11/04* (2013.01); *B60R 1/00* (2013.01); *G03B 37/04* (2013.01);
(Continued)

(58) Field of Classification Search
CPC .. G08G 1/0965; G08G 1/0165; G08G 1/0166; G08G 1/0962; G08G 1/166;
(Continued)

(56) References Cited

U.S. PATENT DOCUMENTS 5,173,881 A * 12/1992  Sindle ................... B60Q 9/006
                                                           367/101
5,289,321 A     2/1994  Secor
(Continued)

FOREIGN PATENT DOCUMENTS

CA    2655727 A1    1/2008
CA    2802122 A1    12/2011
(Continued)

OTHER PUBLICATIONS

European Search Report for application No. EP 10 16 0325 dated Oct. 6, 2010.

*Primary Examiner* — Hoi C Lau
(74) *Attorney, Agent, or Firm* — Simonelli IP, PLLC

(57) ABSTRACT

A method is shown to indicate to a driver of a vehicle the presence of an object moving relative to the vehicle. The method begins by collecting data using a camera or other such image capturing device. The data is analyzed to detect a hazard created by the presence of the object, regardless of whether it is moving or not. A warning associated with the hazard is created. Both the hazard and the warning are displayed using the display device.

9 Claims, 14 Drawing Sheets

Related U.S. Application Data a continuation-in-part of application No. 14/968,132, filed on Dec. 14, 2015, now abandoned, which is a continuation of application No. 13/090,127, filed on Apr. 19, 2011, now Pat. No. 9,238,434.

(51) Int. Cl.
- *B60R 1/00* (2006.01)
- *B60R 11/00* (2006.01)
- *G06T 3/00* (2006.01)
- *G03B 37/04* (2006.01)

(52) U.S. Cl.
CPC ..... *G06K 9/00791* (2013.01); *G06K 9/00805* (2013.01); *G06T 3/0018* (2013.01); *B60R 2011/004* (2013.01); *B60R 2300/306* (2013.01); *B60R 2300/8026* (2013.01); *B60R 2300/8046* (2013.01); *B60R 2300/8093* (2013.01)

(58) Field of Classification Search
CPC ............ G08G 1/096783; B60R 1/1207; B60R 1/0023; B60R 1/0602; B60R 1/088; B60R 1/00; B60R 1/0605; B60R 11/04; H04W 4/046; H04W 4/008; B60Q 9/065; B60Q 9/008; B60Q 9/00; B60Q 9/007; B60Q 9/005; B60Q 1/22
See application file for complete search history.

(56) References Cited

U.S. PATENT DOCUMENTS

| | | | |
|---|---|---|---|
| 5,445,294 A | 8/1995 | Gardner et al. | |
| 5,465,079 A * | 11/1995 | Bouchard | G01S 13/325 180/272 |
| 5,786,772 A * | 7/1998 | Schofield | B60R 21/01564 340/903 |
| 5,949,331 A | 9/1999 | Schofield et al. | |
| 6,553,130 B1 * | 4/2003 | Lemelson | G01S 13/931 340/435 |
| 6,606,027 B1 * | 8/2003 | Reeves | G01S 7/04 340/436 |
| 6,703,925 B2 | 3/2004 | Steffel | |
| 6,947,064 B1 * | 9/2005 | Hahn | G08G 1/0962 345/427 |
| 6,970,184 B2 | 11/2005 | Hirama et al. | |
| 7,012,550 B2 | 3/2006 | Iwakiri et al. | |
| 7,083,311 B2 | 8/2006 | Schreck et al. | |
| 7,194,347 B2 * | 3/2007 | Harumoto | B60R 21/0132 340/436 |
| 7,307,655 B1 | 12/2007 | Okamoto et al. | |
| 7,366,595 B1 | 4/2008 | Shimizu et al. | |
| 7,734,417 B2 | 6/2010 | Chinomi et al. | |
| 7,999,992 B2 | 8/2011 | Mazurkiewicz et al. | |
| 8,031,224 B2 | 10/2011 | Linsenmaier et al. | |
| 8,073,574 B2 * | 12/2011 | Yamamoto | B60T 7/22 180/167 |
| 8,395,514 B2 | 3/2013 | Linsenmaier et al. | |
| 8,460,060 B2 | 6/2013 | Wilson et al. | |
| 8,487,633 B2 | 7/2013 | Fried | |
| 8,537,451 B2 | 9/2013 | Mazurkiewicz et al. | |
| 8,602,573 B2 * | 12/2013 | Brester | B60R 1/0605 359/872 |
| 8,740,427 B2 | 6/2014 | Fritz et al. | |
| 8,779,911 B2 | 7/2014 | Belcher et al. | |
| 8,849,104 B2 | 9/2014 | Eder et al. | |
| 8,854,231 B2 | 10/2014 | Thomas et al. | |
| 8,880,344 B2 | 11/2014 | Mathes et al. | |
| 8,979,288 B2 | 3/2015 | Negel et al. | |
| 9,181,616 B2 | 11/2015 | Evans et al. | |
| 9,238,434 B2 | 1/2016 | Eder et al. | |
| 9,656,601 B2 | 5/2017 | Evans et al. | |
| 2002/0087268 A1 * | 7/2002 | Cazzell | B60Q 9/006 701/301 |
| 2002/0171738 A1 | 11/2002 | Guan | |
| 2002/0180595 A1 * | 12/2002 | Flick | B60Q 1/22 340/435 |
| 2002/0180597 A1 * | 12/2002 | Flick | B60Q 1/22 340/436 |
| 2003/0085806 A1 | 5/2003 | Samman | |
| 2003/0128182 A1 | 7/2003 | Donath et al. | |
| 2004/0193347 A1 * | 9/2004 | Harumoto | B60R 21/0132 701/45 |
| 2005/0111698 A1 * | 5/2005 | Kawai | B60R 1/00 382/103 |
| 2005/0276447 A1 * | 12/2005 | Taniguchi | G06K 9/00362 382/103 |
| 2006/0097858 A1 * | 5/2006 | Kumabe | B60Q 1/50 340/435 |
| 2006/0125919 A1 * | 6/2006 | Camilleri | B60R 1/00 348/148 |
| 2006/0126896 A1 * | 6/2006 | Nagaoka | G01S 17/89 382/103 |
| 2006/0126897 A1 * | 6/2006 | Nagaoka | B60Q 9/008 382/103 |
| 2006/0126898 A1 * | 6/2006 | Nagaoka | B60K 35/00 382/103 |
| 2006/0233424 A1 * | 10/2006 | Miyajima | G06T 17/05 382/104 |
| 2007/0057816 A1 | 3/2007 | Sakakibara et al. | |
| 2007/0273971 A1 | 11/2007 | Waldmann et al. | |
| 2008/0159594 A1 | 7/2008 | Chiu et al. | |
| 2008/0238640 A1 * | 10/2008 | Mori | B60Q 9/00 340/435 |
| 2008/0243337 A1 * | 10/2008 | Tsuda | B60T 8/17557 701/41 |
| 2009/0058678 A1 * | 3/2009 | Matsuoka | B60Q 9/008 340/904 |
| 2009/0189753 A1 * | 7/2009 | Enya | G02B 27/01 340/435 |
| 2009/0231116 A1 * | 9/2009 | Takahashi | B60K 35/00 340/461 |
| 2010/0079298 A1 * | 4/2010 | Ueno | G08B 1/00 340/627 |
| 2010/0104138 A1 * | 4/2010 | Fardi | H04N 7/181 382/106 |
| 2010/0156616 A1 * | 6/2010 | Aimura | G06K 9/00805 340/436 |
| 2010/0201508 A1 * | 8/2010 | Green | B60Q 9/008 340/435 |
| 2010/0253494 A1 * | 10/2010 | Inoue | G01C 21/36 340/436 |
| 2010/0253541 A1 * | 10/2010 | Seder | G01S 13/723 340/905 |
| 2010/0259371 A1 | 10/2010 | Wu et al. | |
| 2010/0273063 A1 | 10/2010 | Wallace et al. | |
| 2011/0109476 A1 * | 5/2011 | Porikli | G06K 9/00818 340/905 |
| 2011/0158510 A1 * | 6/2011 | Aguilar | G06K 9/00718 382/159 |
| 2011/0190972 A1 * | 8/2011 | Timmons | G01C 21/34 701/31.4 |
| 2012/0154587 A1 | 6/2012 | Hwang | |
| 2012/0242505 A1 * | 9/2012 | Maeda | G08G 1/096783 340/905 |
| 2013/0241747 A1 * | 9/2013 | Hatakeyama | B60K 35/00 340/901 |
| 2013/0251194 A1 * | 9/2013 | Schamp | G06T 7/11 382/103 |
| 2013/0321628 A1 * | 12/2013 | Eng | B60R 1/00 348/148 |
| 2014/0062685 A1 * | 3/2014 | Tamatsu | B60Q 5/005 340/425.5 |
| 2014/0200759 A1 * | 7/2014 | Lu | B60D 1/245 701/28 |
| 2014/0226015 A1 * | 8/2014 | Takatsudo | B60R 1/00 348/148 |

(56) References Cited

U.S. PATENT DOCUMENTS

| | | | |
|---|---|---|---|
| 2014/0285667 A1* | 9/2014 | Aimura | G08G 1/166 348/148 |
| 2015/0130937 A1 | 5/2015 | Graumann et al. | |
| 2015/0177378 A1 | 6/2015 | Rostocki et al. | |
| 2015/0193101 A1* | 7/2015 | Mannon | G01C 23/00 715/771 |
| 2015/0194059 A1* | 7/2015 | Starr | G06F 3/0484 701/3 |
| 2015/0358590 A1 | 12/2015 | Hottmann et al. | |
| 2016/0096487 A1 | 4/2016 | Konevsky et al. | |
| 2016/0133130 A1* | 5/2016 | Grimm | H04L 67/22 340/905 |
| 2016/0209000 A1 | 7/2016 | Kurschner et al. | |
| 2016/0341393 A1 | 11/2016 | Kurschner et al. | |
| 2016/0355131 A1* | 12/2016 | Murasumi | B60Q 9/008 |
| 2016/0379497 A1* | 12/2016 | Hatakeyama | G08G 1/166 340/435 |
| 2017/0015256 A1 | 1/2017 | Henion et al. | |
| 2017/0015802 A1 | 1/2017 | Hall et al. | |
| 2017/0066379 A1 | 3/2017 | Herrmann et al. | |
| 2017/0066380 A1 | 3/2017 | Shah et al. | |
| 2017/0072839 A1 | 3/2017 | Schmidt et al. | |
| 2017/0090100 A1 | 3/2017 | Fritz | |
| 2017/0097135 A1 | 4/2017 | Fritz et al. | |
| 2017/0371036 A1 | 12/2017 | Griffin | |
| 2018/0101738 A1* | 4/2018 | Mualla | B60Q 9/008 |

FOREIGN PATENT DOCUMENTS

| | | |
|---|---|---|
| CN | 103424112 A | 12/2013 |
| DE | 10030359 | 2/2002 |
| DE | 10043099 A1 | 3/2002 |
| DE | 102008031784 | 4/2009 |
| DE | 102008035429 | 4/2009 |
| DE | 102007054342 B3 | 6/2009 |
| DE | 102011103200 A1 | 12/2012 |
| DE | 102011053999 A1 | 3/2013 |
| DE | 102012104529 A1 | 11/2013 |
| DE | 102012107833 A1 | 2/2014 |
| DE | 102012107834 A1 | 2/2014 |
| DE | 102015115555 A1 | 9/2015 |
| DE | 102016107545 A1 | 10/2017 |
| EP | 2123731 A1 | 11/2009 |
| EP | 2301803 A1 | 3/2011 |
| EP | 2792556 A1 | 4/2013 |
| EP | 2738043 A1 | 6/2014 |
| EP | 2792555 A1 | 10/2014 |
| EP | 2933155 A1 | 10/2015 |
| JP | 2000071877 | 7/2000 |
| WO | 03051671 | 6/2003 |
| WO | 2009043783 | 4/2009 |
| WO | 2013037694 A1 | 3/2013 |
| WO | 2016147154 A1 | 9/2016 |
| WO | 2017174392 A1 | 10/2017 |
| WO | 2017191033 A1 | 11/2017 |

* cited by examiner

REAR VIEW MIRROR SIMULATION

This patent application is a continuation-in-part of U.S. patent application Ser. No. 14/968,132, which is a continuation of U.S. patent application Ser. No. 13/090,127. Furthermore this patent application claims the priority of U.S. patent application Ser. No. 15/287,554, which is hereby incorporated herein by reference. The invention is based on priority patent applications EP 10160325.6 and U.S. Ser. No. 15/287,554 which are hereby incorporated by reference.

BACKGROUND ART

1. Field of the Invention

A first aspect of the invention relates to an exterior mirror simulation with image data recording and a display of the recorded and improved data for the driver of a vehicle.

A second aspect of the invention relates to an environment simulation with image data recording and a display of the recorded and improved data for the driver of a vehicle. In particular, an enlarged optical display, displayed on a display unit and arranged inside a vehicle, is provided. The display view changes hereby to a different display view, especially an enlarged view, when detecting possible hazardous situations.

The display on a display device shows the data in a way favored by the driver or vehicle manufacturer.

2. Description of the Related Art

Several solutions for recording image data and its display for the driver of a vehicle are known in the prior art. The image recording is done by one or several cameras installed in the vehicle. The different assistance systems process the data from the captured image in very different ways.

Other well-known solutions relate to image displaying processes for rear-view cameras, suited to display images and, with the help of sensors, distance information regarding an obstacle behind the vehicle. In addition, systems including an image magnification function when changing into reverse gear and activated when the vehicle approaches an obstacle are well known. In US patent application having publication number 2008/0159594, a system is known which records images from the surroundings of the vehicle with a fish-eye lens. Image data is recorded with great distortion through this wide-angle lens. The image data recorded by the camera pixels are rectified block by block. The display of the image is done with the rectified image data, since an image of the surroundings of the vehicle is required.

A camera for assisting reversing is known in DE 102008031784. The distorted camera image is edited and rectified, which leads to an undistorted image. This is then further processed, in order to optimize the perspective for reversing.

In U.S. Pat. No. 6,970,184 B2, an image displaying process is known, which determines the distance to an obstacle behind the vehicle with the help of a distance sensor. This process is activated when changing into reverse gear and displayed on the display of a navigation system.

In DE 102010034140 A1, a process for displaying images on a display device and a driving assistance system is shown with the use of a sensor. The image data from two external cameras, providing each one image from the environment, is used to indicate the present distance to an object and switch from one image to another.

US 20100259371 A1 discloses a parking assistance system using an ultrasonic sensor. Here, a picture change is suggested and a distance display, reveals the calculated distance to an object.

From WO 2013101075 A1, an object detection system raises an acoustic warning when an object approaches the vehicle or the vehicle approaches an object, realized with the help of a sensor.

DE 102012007984 discloses a maneuvering system to automatically move a vehicle with a vehicle-side installed control device which is designed to output control signals to a driving and/or steering device of the motor vehicle and thereby automatically carry out an automatic maneuvering operation of the vehicle.

An object monitoring system is known from WO 2011153646 A1, whereby images are generated using more than one camera and transmitted to an evaluation unit in order to avoid possible collisions.

From EP 2481637 A1 a touch display is known, offering the possibility to select an object on the display and to calculate the distance of the respective object. The information can be provided either via an audio signal and/or a visual representation.

US 20070057816 discloses a parking assistance method using a camera system, which ensures stopping during the vehicle parking process with the aid of a picture taken from the bird's eye view.

From EP 1725035, an image acquisition system is supplied with images from a plurality of cameras, attached to the body of a vehicle. The driver of the vehicle can then select images via a touch display as required. The driver thus has the possibility to select pictures and get them displayed according to the needs of the present situation.

From EP 1462342 a parking assist apparatus and method are known, in which a vehicle driver sets a target parking position for the vehicle to be parked in on a display, displaying the image from a back camera. The area can be colored and has to be moved by the driver to a suitable spot, so that the parking assistant can assist in or conduct parking the vehicle.

From WO200007373, a method and an apparatus are disclosed for displaying images are known which use a synthesized image composed of a plurality of images shot by a plurality of cameras to facilitate the understanding of the overall situation.

A blind spot indicator is disclosed in U.S. Pat. No. 8,779,911 B2, which is adjacent to a second mirror surface of a rear view device, a so called spotter area, used to observe objects located in a blind spot of the vehicle.

An assistance system is known from EP 1065642 that records an image via a camera and displays the position of the steering axles in the area of the vehicle in order to reach a possible parking position.

WO 2016126322 relates to a configuration for an autonomously driven vehicle in which the sensors, providing 360 degrees of sensing, are accommodated within the conventional, existing exterior surface or skin of the vehicle.

CN 103424112 discloses a laser-based visual navigation method to support a movement carrier autonomous navigation system. To increase the reliability, a plurality of vision sensors are combined and the geometric relationship between the laser light source and the vision sensors is effectively utilized.

WO2014016293 relates to an ultrasonic sensor arrangement placed within a motor vehicle, which can be used for supplying data to a parking assistant to show the distance of the motor vehicle to obstacles to the driver.

SUMMARY OF THE INVENTION

In contrast, the object of a first aspect of the invention is to create a display of a camera image, which corresponds to the familiar image in a rear view mirror. The distortions of the image caused by the different mirror glasses are provided for the driver in the usual manner.

The present invention relates to image rectification for a vehicle, which includes a display device, in order to show modified images and an imaging device for receiving the recorded images, which have been improved by image rectification. Furthermore, the system comprises image rectification in communication with the display device and the imaging device, so that pixels, which are located in the recorded images, are improved by reorientation or repositioning of the pixels from a first position to a second position by means of a transmission or transfer process.

Furthermore, the invention relates to a rear-view image improvement system for a vehicle, which includes a display device for showing modified images, which have been improved by the image improvement system, and an imaging device for receiving recorded images, which have been improved by the image improvement system. The system also comprises an image improvement module in connection with the display device, and indeed in such a way that pixels, which are located in the recorded images, are grouped and spread out, in order to form at least one region of interest, in which reference is made to the pixels from a base plane in the recorded image, in order to form the modified images.

Additionally, the object of the second aspect of this invention is to create and display a camera image, which corresponds to the best true to the scale image of a region of interest. The distortion and/or the manipulation of the image assists the driver to perceive the situation displayed in the region of interest.

The invention relates to a further improvement of the displaying system to relay an accurate or enhanced image from a region of interest, including for example a hazardous situation, to the driver by combining state-of-the-art technology, sensors, image capturing and analysis systems. This is done in such a way, that the driver receives a best possible true to the scale estimation of the region of interest and can perceive the situation comprised within the region of interest, for example with the help of numerical, graphical and/or audio representation variants within the vehicle, particularly displayed on the display unit.

The invention relates further to a system for improving the perception of the driver by using different graphical representations and color scales.

Furthermore, the invention relates to a vehicle comprising display devices, processing devices and sensors such as cameras.

The object of the invention is to also provide an object detection and classification system with image feature descriptors derived from periodic descriptor functions.

An object detection and classification system analyzes images captured by an image sensor for a hazard detection and information system, such as on a vehicle. Extracting circuitry is configured to extract at least one feature value from one or more keypoints in an image captured by an image sensor of the environment surrounding a vehicle. A new image feature descriptor is derived from a periodic descriptor function, which depends on the distance between at least one of the keypoints and a chosen query point in complex space and depends on a feature value of at least one of the keypoints in the image.

Query point evaluation circuitry is configured to sample the periodic descriptor function for a chosen query point in the image from the environment surrounding the vehicle to produce a sample value. The sample value for a query point may be evaluated to determine whether the query point is the center of an object or evaluated to determine what type of object the query point is a part of.

If the evaluated query point satisfies a potential hazard condition, such as if the object is classified as a vulnerable road user or object posing a collision threat, a signal bus is configured to transmit a signal to alert the operator of the vehicle to the object. Additionally, or alternatively, the signal bus may transmit a signal to a control apparatus of the vehicle to alter the vehicle's speed and/or direction to avoid collision with the object.

The object detection and classification system disclosed herein may be used in the area of transportation for identifying and classifying objects encountered in the environment surrounding a vehicle, such as on the road, rail, water, air, etc., and alerting the operator of the vehicle or autonomously taking control of the vehicle if the system determines the encountered object poses a hazard, such as a risk of collision or danger to the vehicle or to other vehicles or persons in the area.

Another aspect of this invention is a rearview device and illumination means comprising different functions.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
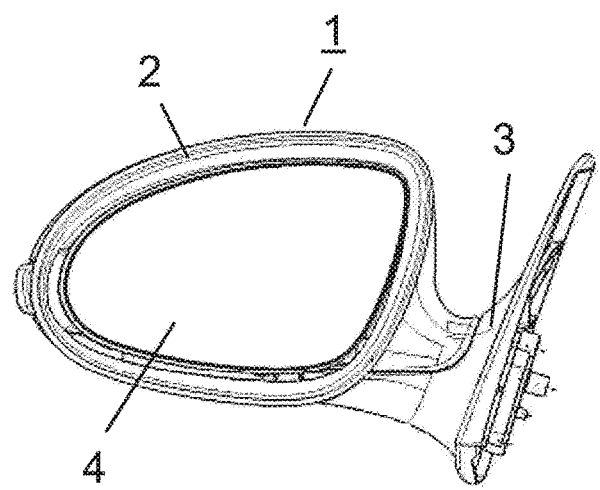
FIG. 1 shows an exemplary exterior mirror.

FIG. 1 shows an exterior mirror 1, which comprises a mirror head 2, which is connected to a vehicle by a mirror base or bracket 3. The mirror head 2 forms an opening for a mirror glass 4.

The size of the mirror glass 4 is determined by the mounting on the vehicle, as well as by the different legal regulations about the available field of view. In this process, different glass types for different regions have developed. In the USA, a flat plane glass is used on the driver side.

Figure 2:
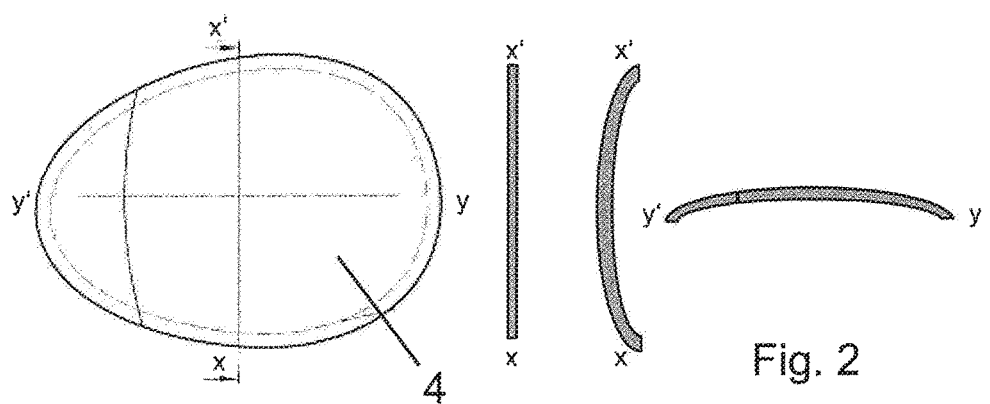
FIG. 2 shows an examples of a mirror type.

A mirror glass 4 with a curvature radius is shown in FIG. 2. The glass in FIG. 2 can be used in mirror assemblies on the passenger side of the vehicle and on the driver side of the vehicle in countries other than the USA. Convex mirror glasses as well as glass with an aspherical part are used in addition to convex glass.

The driver of a vehicle is used to the display of each type of exterior mirror, and therefore can deduce for himself the warning information which he needs to steer the vehicle through the traffic.

Exterior mirrors contribute to the overall wind resistance of the vehicle. The aerodynamics of a vehicle are influenced by the exterior mirror. Therefore, it is sensible to replace it with the camera system that provides the same field of view while reducing the adverse effect on aerodynamics, and so to minimize the total CO2 emissions of the vehicle, by reducing the turbulent flows around the vehicle, and creating a predominantly laminar flow.

Figure 3:
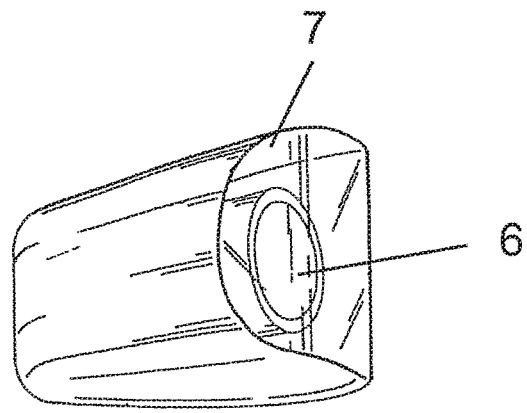
FIG. 3 shows a camera installation.

FIG. 3 shows a possible installation of a rear view assembly, generally indicated at 10 in a vehicle. The optical sensor 6, of which only the optic lens can be seen in the figure, is enclosed in a housing 7. The housing 7 is tightly mounted to a vehicle 8, best seen in FIG. 4. The housing 7 has a form which is streamlined on the vehicle 8. The optical sensor itself is installed in the housing 7, and has a watertight seal against weather effects, as well as against the influence of washing processes with detergents, solvents and high pressure cleaners.

Figure 4:
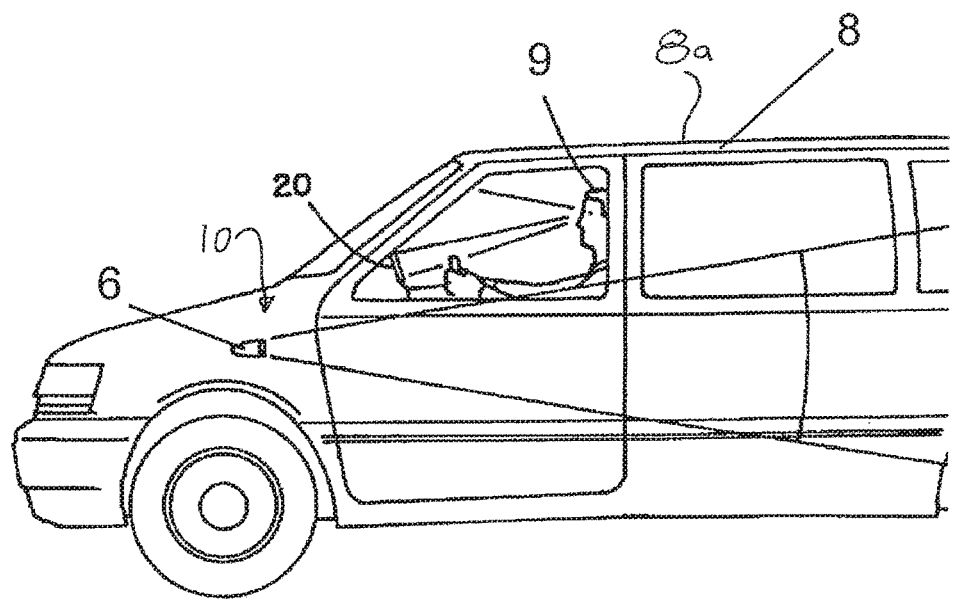
FIG. 4 shows an exemplary vehicle.

The housing 7 includes an opening, through which the camera cabling is led. In this process, the connection of the camera to the electric system of the vehicle 8 is done by any bus system or a separate cable connection. FIG. 4 shows as an example the attachment position of a sensor in the housing 7 on the vehicle 8. The camera position is therefore to be chosen in a way that fulfils the legally required field of view. The position can therefore be on the front mudguard, on the mirror triangle or on the edge of the vehicle roof 8a. Through the application of a wide-angle lens, it is possible that the field of view of the sensor will be larger than through a conventional mirror.

A display device 20, which can be seen by the driver 9, is mounted into a vehicle 8. The picture from the camera is transmitted to the display device 20. In one embodiment, the display device 20 is mounted to an A-pillar 21 of the motor vehicle 8.

Figure 5:
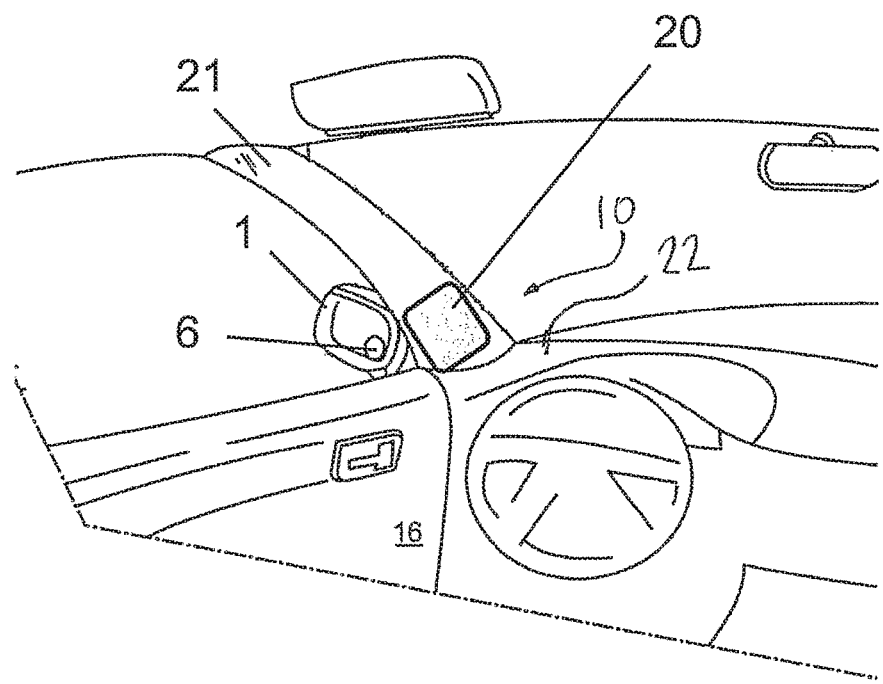
FIG. 5 shows a display in the vehicle.

FIG. 5 shows an exemplary embodiment of the present invention 10 with a display device 20, which is provided in the vehicle cab or vehicle interior for observation or viewing by the driver 9. The rear view assembly 10 delivers real-time wide-angle video images to the driver 9 that are captured and converted to electrical signals via the optical sensor 6. The optical sensor 6 is, for example, a sensor technology with a Charge-Coupled Device ('CCD') or a Complementary Metal Oxide Semiconductor ('CMOS'), for recording continuous real-time images. In FIG. 5, the display device 20 is attached to the A-pillar 21, so that the familiar look in the rear view mirror is led to a position which is similar to the familiar position of the exterior mirror used up to now.

In the event of mounting on the A-pillar 21 being difficult due to the airbag safety system, a position on the dashboard 22 near to the mirror triangle or the A pillar is also an option.

The display device 20 shows the real-time images of camera 6, as they are recorded in this example by a camera 6 in the exterior mirror.

The invention is not dependent on whether the exterior mirror is completely replaced, or if, as is shown in FIG. 5, it is still available as additional information. The optical sensor 6 can look through a semitransparent mirror glass, for example a semitransparent plane mirror glass.

Figure 6:
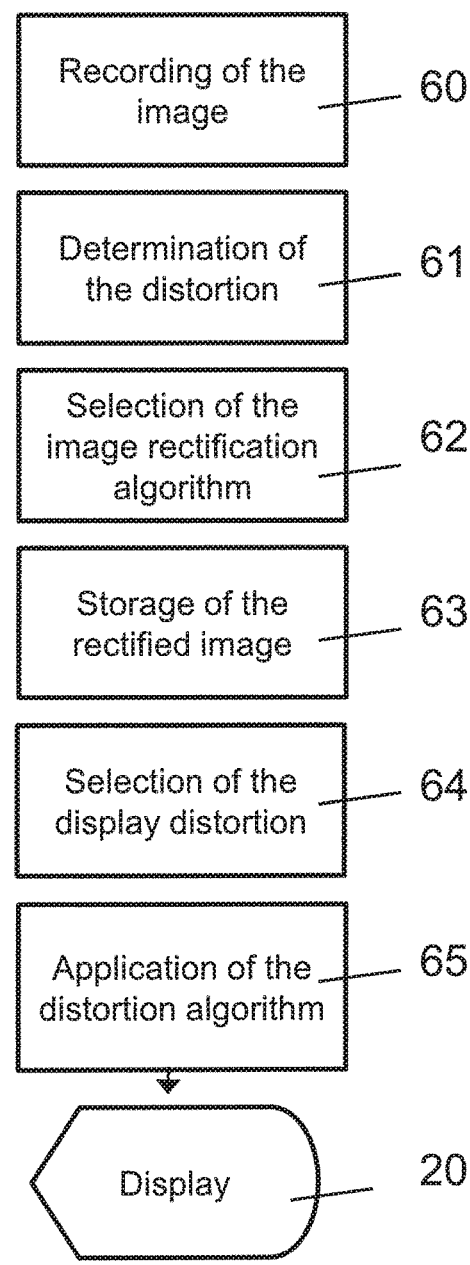
FIG. 6 shows the process of image capture.

The field of view recorded by an optical sensor 6 is processed and improved in an image rectification module, which is associated with the rear view assembly 10, according to the control process shown in FIG. 6. The image rectification module uses a part of the vehicle 8 as a reference (e.g. a part of the vehicle contour) when it modifies the continuous images, which are transmitted to the display device 20 as video data. The display device 20 can be a monitor, a liquid crystal display device or a TFT display, or LCD, a navigation screen or other known video display devices, which in the present invention permit the driver 9 to see the area near to the vehicle 8. The application of OLED, holographic or laser projection displays, which are adapted to the contour of the dashboard or the A pillar 21 are useful.

The image rectification occurs onboard the vehicle 8, and comprises processing capacities, which are carried out by a computation unit, such as, for example, a digital signal processor or DSP, a field programmable gate array ('FPGA'), microprocessors or circuits specific to use, or application specific integrated circuits ('ASIC'), or a combination thereof, which show programmability, for example, by a computer-readable medium such as, for example, software or hardware, which is recorded in a microprocessor, including Read Only Memory ('ROM'), or as binary image data, which can be programmed by a user. The image rectification can be formed integrally with the imaging means 20 or the display device 14, or can be positioned away in communication (wired or wireless) with both the imaging means as well as the display device.

The initiation or starting up of the image rectification occurs when the driver starts the vehicle. At least one display device 20 displays continuous images from the side of the vehicle, and transmits the continuous images to the image rectification device. The image rectification device modifies the continuous images and transmits the improved images by video data to the display device 20, in order to help the driver.

The individual steps of image rectification as well as image distortion are shown in FIG. 6. In this process, the invention distorts the image of the wide-angle camera and applies post-distortion to this image, in order to give this image the same view as that of the desired mirror glass.

The first step is the recording of the image. In a second step, the type of distortion, to which the image is subjected, is determined.

In a further step, the algorithm is selected, which is adapted to the present distortion. An example is explained in DE 102008031784.

An optical distortion correction is an improving function, which is applied to the continuous images. The optical distortion correction facilitates the removal of a perspective effect and a visual distortion, which is caused by a wide angle lens used in the camera 6. The optical distortion correction uses a mathematical model of the distortion, in order to determine the correct position of the pixels, which are recorded in the continuous images. The mathematical position also corrects the pixel position of the continuous images, as a result of the differences between the width and height of a pixel unit due to the aspect or side ratio, which is created by the wide angle lens.

For certain lenses, which are used by the camera 6, the distortion coefficient values k1 and k2 can be predetermined, in order to help in eliminating the barrel distortion, which is created by the use of a wide-angle lens. The distortion coefficient values are used for the real-time correction of the continuous images.

The distortion coefficient values k1 and k2 can be further adjusted or coordinated by using an image, which is recorded in the continuous images, which shows the known straight line, for example, the lane markings on a road. According to this aspect of the present invention, the distortion center is registered by analysis of the recorded continuous images in the search for the straightest horizontal and vertical lines, whereby the center is situated where the two lines intersect. The recorded image can then be corrected with varied or fine-tuned distortion co-efficient values k1 and k2 in a trial and error process. If, for example, the lines on one side of the image are "barrel distorted" ("barreled") and lines on the other side of the image are "pin cushion distorted" ("pin-cushioned"), then the center offset must move in the direction of the pin-cushioned side. If a value is found, which sufficiently corrects the distortion, then the values for the distortion center 42 and the distortion coefficient values k1 and k2 can be used in the mathematical model of optical distortion correction.

Figure 7:
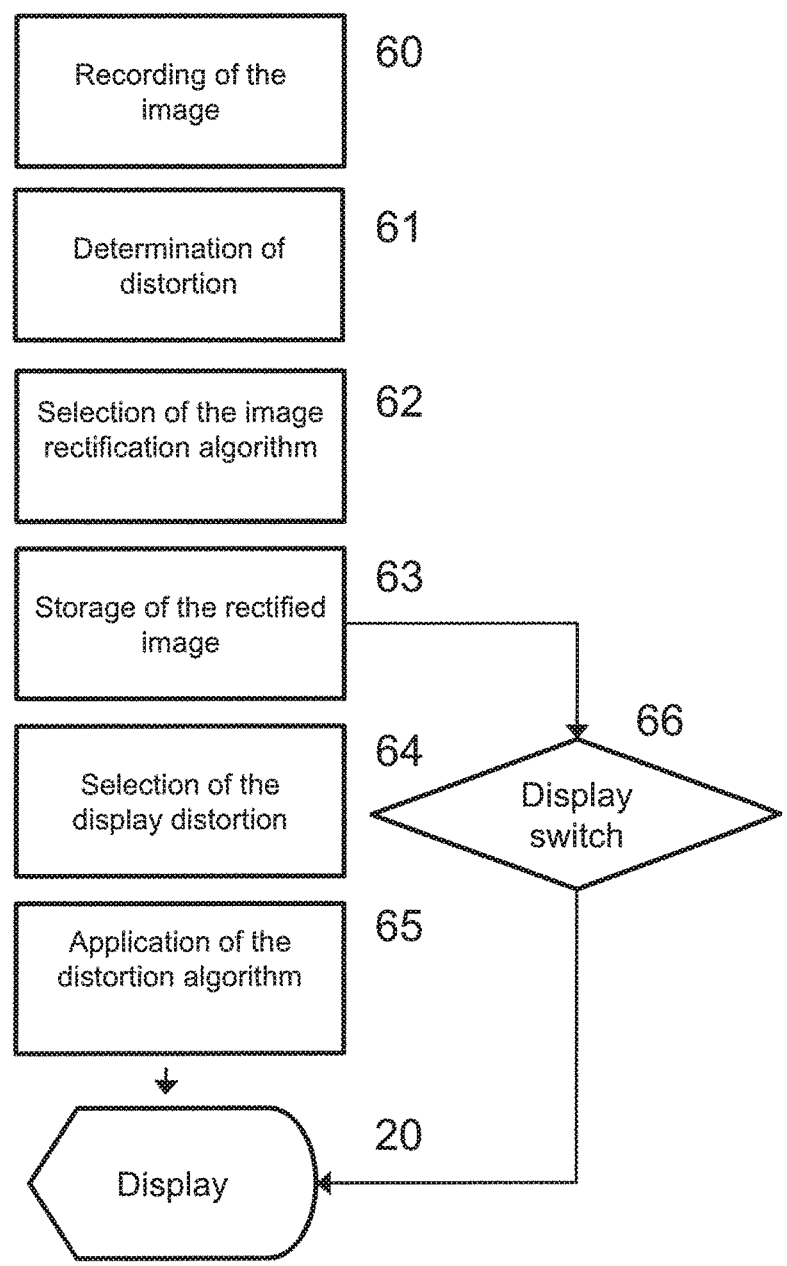
FIG. 7 shows an alternative process.
Figure 8:
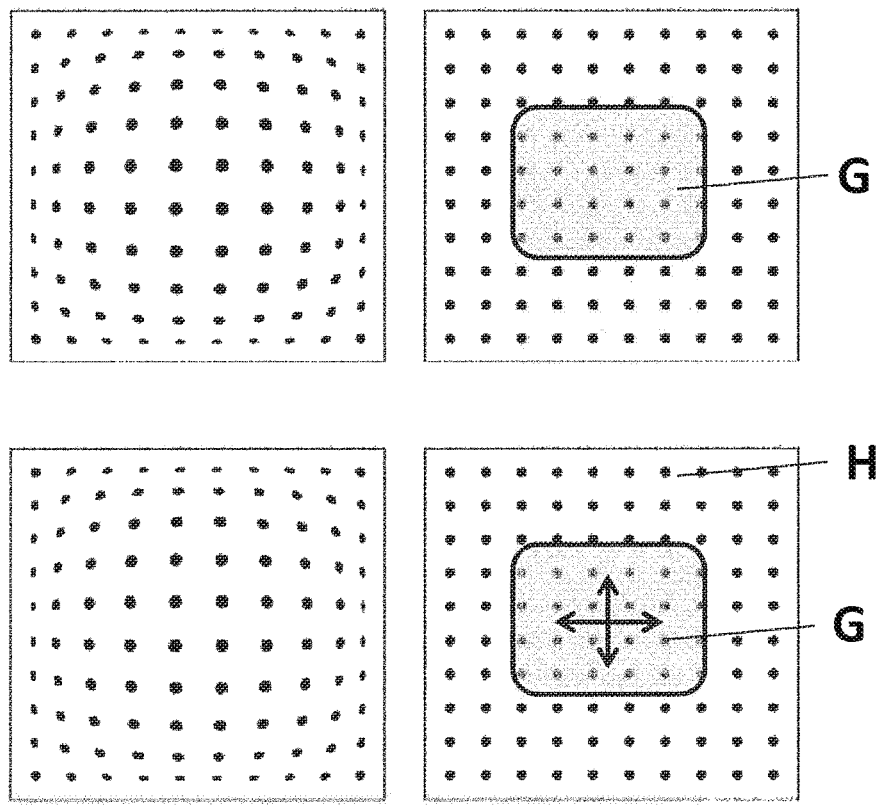
FIG. 8 shows distorted and rectified pixel areas.

As a result of the rectification stage at 63, a low-error image is given at 64, which can be shown on the display device 20. The image obtained after rectification corresponds to the image of a plane mirror, whereby the simulated mirror surface would be larger than the usual mirror surface. If such a plane mirror is simulated, the further steps are eliminated and the data is displayed directly on the display according to FIG. 7. The image of a plane mirror is defined by a selection of pixels of the optical sensor. In this way, as shown in FIG. 8, only the pixels in the middle of the optical sensor are chosen. In order to simulate the plane mirror in a larger approximation on the hardware mirror, data must be cut, and the section is limited to a section in the middle of the image.

The operator which is applied to the pixels in order to achieve the desired image is determined in the next step 64. For example, the algorithm is selected in order to again distort the low-error image as would be shown in mirror glass with an aspheric curve, for example. Therefore, the pixel values must be moved in a certain area in order to obtain the impression of curved mirror glass.

In the next step 65, the post-distortion of the present image is carried out. For example, a plane mirror with a convex additional mirror is chosen. For this purpose, a defined number of pixels is chosen for the display of the plane mirror surface. In FIG. 8, it is area G which shows plane surfaces in the middle of the optical sensor. For the display of information from the convex mirror, all pixels of the sensor must be used, both area G as well as H, in order to provide data to the wide-angle representation of the image, which is situated in a defined area of the display. This is due to the fact that the additional convex mirror will produce an image of which a portion overlaps the image that is created by the plane mirror.

The information from all pixels is subject to a transformation, and the image of all pixels is distorted and shown on a small area of the display. In this process, information is collated by suitable operators in order to optimally display the image on a lower number of display pixels.

All operations described up to now present a defined image while the vehicle is in motion. The image is adjusted depending on the application of the vehicle.

A further adjustment possibility of the simulated exterior mirror is the function of adapting the field of view to the driver's position. As in a conventional mirror, which is adapted by an electric drive to the perspective of the driver, the 'mirror adjustment' of the plane mirror simulation is done by moving section A on the optical sensor, so that other pixels of the optical sensors are visualized. The number of pixels, and therefore the size of the section, is not changed. This adjustment is indicated by the arrows in FIG. 8.

For a convex mirror, the adjustment to the perspective of the driver is not connected with simply moving a pixel section, but rather with a recalculation of the image.

The whole control of the exterior mirror simulation is done by control elements, which are used in the conventional way on the vehicle door or on the dashboard.

Furthermore, the invention also relates to a further improvement of the displaying system to relay an accurate image from a region of interest, that may include for example a hazardous situation, to the driver by combining state-of-the-art technology, sensors, image capturing and analysis systems. This is done in such a way that the driver receives a best possible true-to-scale estimation of the region of interest, and the drive can perceive the situation within the region of interest, for example with the help of numerical, graphical, audio representation variants or any combination thereof within the vehicle, many of which may be displayed on the display device 20.

The vehicle 8 can detect hazardous situations not only when moving, but also when pausing, parking and during the process of parking. The information is delivered to the vehicle 8 using a different signaling device. The signaling device may include sensors, imaging capturing and data analysis systems, any other possible device to transform information from the environment and from within the vehicle 8 into data usable by the vehicle 8, data links to other objects, for example vehicles or stationary stations, as well as any combinations hereof.

Figure 9:
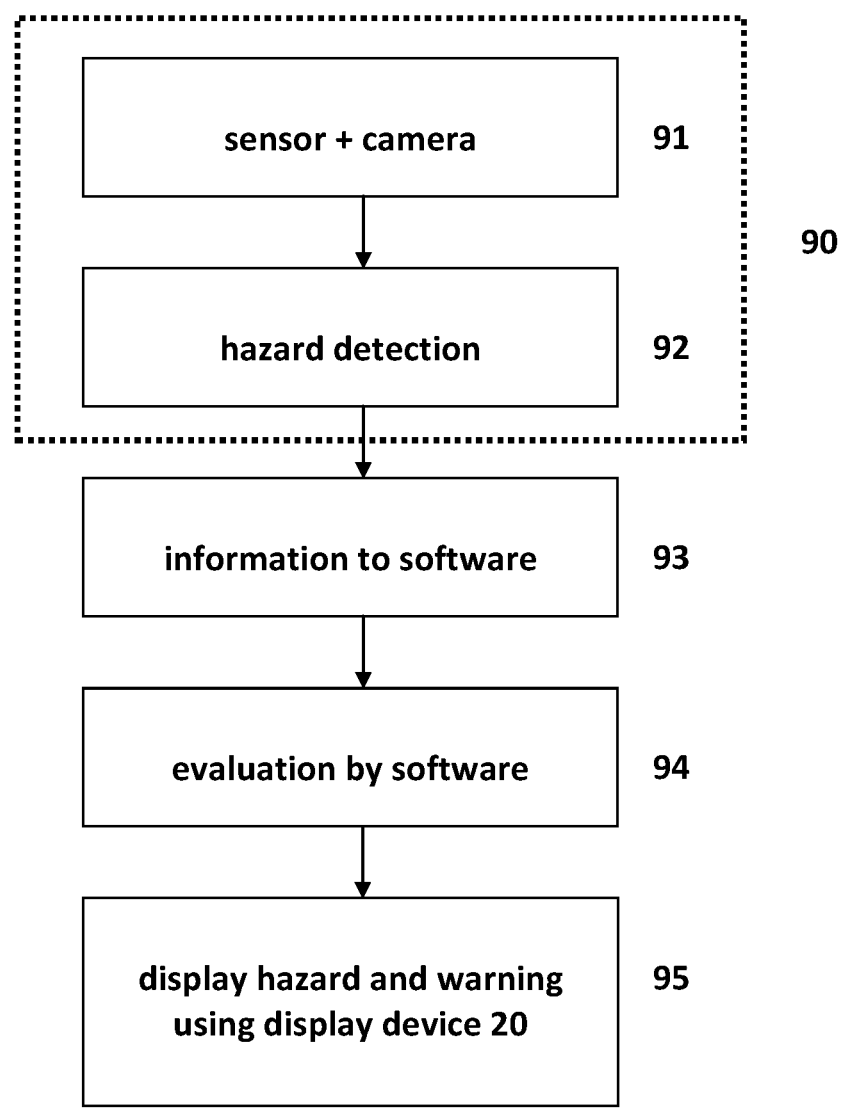
FIG. 9 shows an alternative process from acquiring to displaying the relevant information.

One embodiment of the process from acquiring the data to displaying the relevant information is shown in FIG. 9. The signaling device 90, by way of example, includes a sensor and a camera 91, collects data and analyzes it to detect possible hazard situations within a hazard detection module 92. When detecting a possible hazard situation, the signaling device 90 transmits information at 93 to the driver assistant software. The method then evaluates the information at 94, rectifies it and transmits it to the display unit to be displayed at 95 to the driver.

The vehicle 8 recognizes an object moving relative to the vehicle 8, for example a pedestrian walking on the sidewalk, with the help of the signaling device 90. One part of the signaling device 90 detects this moving object and calculates the distance to the vehicle. The same or another part of the signaling device marks this object, for example with a color, and relays the information with the help of a display device to the driver. The display device 20 is configured to pass the information that a potential hazard has been detected at a specific distance, e.g. 30 meters to the vehicle 8. The display device 20, showing the respective region of interest in which the potential hazard has been detected, is now subdivided to show at least two images, for example a normal, and additionally a rectified image of the respective region, whereby the rectified image of the respective region can be an enlarged view of the respective region. Additionally it is possible to subdivide the display device into multiple parts.

Then multiple different images, for example rectified or non-rectified images of multiple detected possible hazards, can be shown.

Figure 10A:
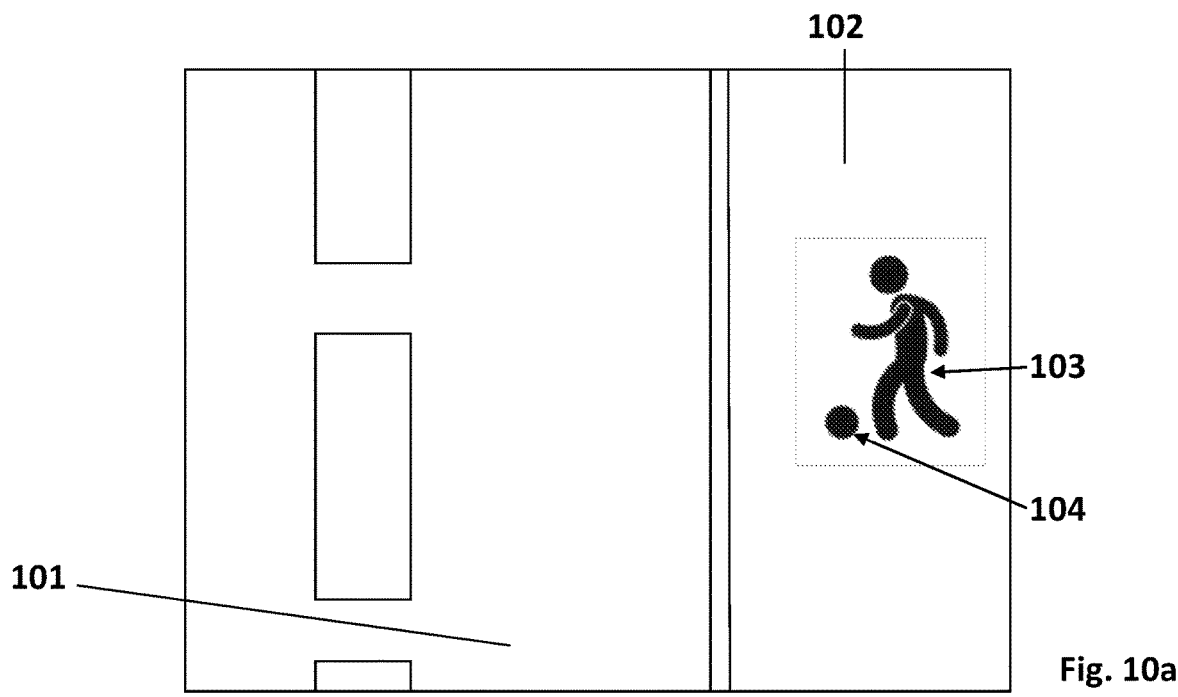
FIGS. 10a and 10b show an example of hazardous detection during operation.
Figure 10B:
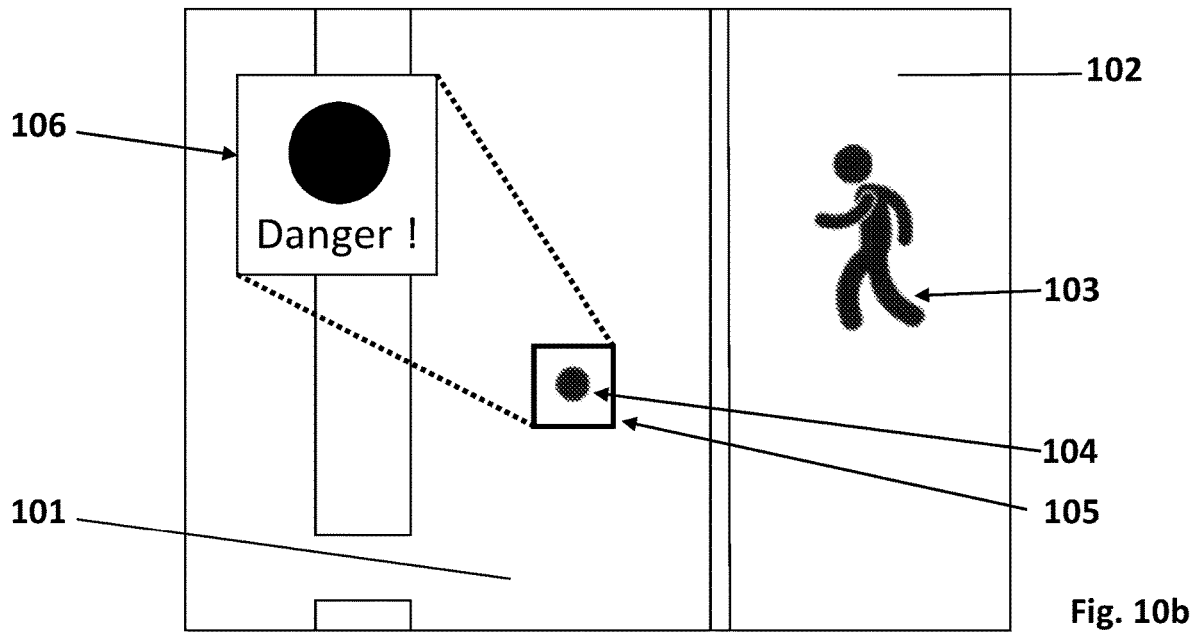

This is exemplarily shown in FIGS. 10a and 10b, wherein in FIG. 10a the image of the situation in front of a vehicle 8 is depicted, comprising a street 101, a sidewalk 102 and two objects 103 and 104 located on the sidewalk. In FIG. 10b, the object 104, is now present on the street and the signaling device 90 detects this as a possible hazard object within a respective region of interest 105. The display device 20 is subdivided to provide the normal view of the image and additionally an enlarged view 106 of the respective region 105, in which the possible hazard object has been detected. Additionally, another indicator in form of the alphanumeric characters "Danger!" is used here to support the perception of the situation by the driver.

To react accordingly to the present situation, either the nearest potential hazard object is shown in the rectified image of the respective region and the view is switched to the next nearest potential hazard object after passing the nearest potential hazard object, or the order in which the potential hazard objects are shown in the rectified image of the respective region is arranged according to the level of hazard the potential hazard objects pose, starting from the highest rated potential hazard to the lowest rated potential hazard. The level of hazard can be derived for example form accumulated velocity and position data of the respective objects.

Additionally, the signaling device 90 can mark the potential hazard objects as rated (described earlier) either based on distance or level of hazard, wherein the characteristic properties of these markings can be comprised of color, brightness, shading, hatching or any other type of possible quality as well as any combinations thereof, constant with respect to time or varying with time, displayed on the display device 20.

Additionally, the signaling device 90 can mark the objects or parts of objects surrounding the vehicle 8 and determine the distances of the respective objects or part of the objects. Then it can associate a color with each of the respective object or part of the object based on the distance of the respective object or part of the object and display this information on the display device 20. Thereby the distance information is connected with the color information, allowing a better anticipation and understanding of the distance information on the display device 20.

The display device 20 may also include a navigation device, a head-up display, any other kind of devices suitable for displaying numerical, graphical and/or audio representation variants, or any combination thereof.

The signaling device 90 can also recognize the situation arising when the driver initializes the process of parking, irrespective of the gear used and the direction in which the parking is performed. When the driver changes for example into reverse gear, the image transmitted to the display device 20 shows a normal image of the region behind and/or adjacent to the sides of the vehicle. As soon as the driver approaches a relevant object in the vicinity of the reversing vehicle 8, for example a curbstone, another vehicle, a fire hydrant or any other type of object, located in a respective region of interest of the display device 20, the situation displayed on the display device 20 changes to a rectified image of the respective region of interest, preferably an extended view of the respective region of interest.

The situation displayed on the display device 20 during the parking process, the rectified image of the respective region of interest, covers the whole area of the display unit.

At the same time, the signaling device 90 detects and calculates the distance to the relevant object and relays this information with the help of the display device 20 to the driver by numerical, graphical, audio representation variants or any combination thereof, preferably by using a graphical representation, preferably by using a range of different colors, brightness, shadings, hatchings or any other type of possible quality as well as any combinations thereof, constant with respect to time or varying with time.

The same holds true for the vehicle 8 attempting to park when using the forward gear so that the display device 20 shows an image of the region in front and/or adjacent to the sides of the vehicle 8.

Instead of concentrating on a single relevant object, the signaling device 90 can also mark different objects in the vicinity of the vehicle 8 and display the distance information on the display device 20 by numerical, graphical, audio representation variants or any combination thereof, preferably by using a graphical representation, in particular by using a range of different colors, brightness, shadings, hatchings or any other type of possible quality as well as any combinations thereof, constant with respect to time or varying with time, and therefore enhance the perception of the situation by the driver.

Using color as the characteristic quality and relating the distance of the objects to the displayed color of the objects can especially enhance the perception of the situation by the driver, when the driver is not able to naturally perceive depth or distance information by optical means, due to for example a missing stereoscopic view, a missing ability to read the distance information or other inabilities in one of these directions. The color scheme used to signify the distance of the object can be adapted to the personal needs of the driver, for example a version without ambiguities for persons having the inability to discern between different colors. Instead of the color quality another characteristic quality, for example the brightness, can be used to signify the distance of the respective objects for persons which have the inability to perceive colors, so that also in this cases the perception of the driver can be enhanced. This holds true for all other possible combinations of different qualities and/or the different representation variants.

When the vehicle 8 is not moving, that is parking or temporarily halting, for example due to a red traffic light, the signaling device 90 is used to identify relevant objects which pose a possible hazard in the near or far vicinity of the vehicle 8. These objects are for example pedestrians, bicycle riders or other vehicles, but also other objects having the possibility to move temporary or to be moved, for example boom barriers or bollards. The image displayed on the display device 20 is chosen as to optimize the perception of the situation and the possible hazards by the driver from one or more of the methods described above, for example showing an enlarged view of the possible hazard objects and/or marking the possible hazard objects with different colors.

When applicable, also the perception of the person sitting next to the driver or another person sitting, in fact all fellow passengers in the vehicle 8 is enhanced. This is achieved by using the methods described above and, when necessary, splitting the image displayed on the display device 20 to provide two or more different images, one for each of the respective persons, displaying different images on different display device 20 for the respective persons or any combination thereof. This is especially useful in situations, in which the driver and the fellow passenger require different information, for example when opening the doors and/or exiting on different sides and facing therefore different possible hazards. This is also useful in situations in which the signaling unit 90 is not able to display all the different possible hazards on one single display device 20 or the number of possible hazards is so large, that one driver alone is not able to perceive the complete situation.

A special potential hazard situation is present when an object moves into or is located inside a region not visible for the driver and/or another person sitting in the vehicle, often referred to as a blind spot. This typically comprises for example the area left and right of the vehicle which is not captured by the rear-view devices such as the external rear-view mirrors, but also the area in the surrounding of the vehicle 8 where the view is blocked by parts of the vehicle 8 itself. Objects inside these regions are detected and either marked and displayed as described in the situations above, or a special warning signal is sent to the driver and/or the respective persons sitting in the vehicle to inform them of this special possible hazard. This special warning signal can be comprised of numerical, graphical and/or audio representation variants or any combination thereof, in particular a time varying signal, such as for example a blinking graphical representation, preferably a frame or part of a frame, or a tone.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or object within or outside of the vehicle for which information can be provided.

To provide information to the driver, it can be advantageous to reduce and/or specify the amount of information provided to the driver, for example in images which can naturally comprise a huge amount of information and which might be not or not really or only partially important to the driver.

In one embodiment, a zoom function is applied/used to direct the attention of the driver to at least one point of interest (POI), for example like a specific detail, area, event and/or object, by enlarging the view around this POI and reducing the amount of information besides the POI and not related with it, while still providing contextual information about the details and/or the area close to the POI.

In another embodiment of this zoom function, additional information is provided to the driver. This additional information can comprise for example a graphical, audio, tactile, taste, smell signal and/or any combination thereof, providing vehicle and/or environment in an advantageous way.

In this embodiment, this signal comprises a graphical representation of the distance between the vehicle and at least one POI. This graphical representation can for example be a scale in which at least a parameter of the signal, for example the color, brightness, contrast, polarization, size and/or form of the output of the graphical representation, is used with at least one function of at least one parameter of the vehicle and/or environment, for example the distance between the vehicle and a POI, and in which the at least one function can be comprised of for example a linear function, an exponential function, a logarithmic function, a polynomial function, a constant function and/or any combination thereof.

In one specific embodiment the color of the graphical representation is used to enhance the perception of the distance information provided by the vehicle with respect to at least one POI, in which the colors are chosen according to the purpose, for example signifying an approaching object in the direction of travel.

When driving and/or reversing and approaching a POI with which contact should not be made, the color of the graphical representation can change from green, signaling a large distance, to red, signaling a small distance. When driving and/or reversing and approaching a POI with which contact is desired, for example a coupling device, the colors of the graphical representation can be used in a reversed meaning, that is using the red color to signify a large distance and the green color to signify a small distance. When driving and/or reversing and approaching a POI with which keeping a specific distance is desired, a two-sided scale can be used signaling large distances away from the desired distance in both directions with one color, for example red, and the optimal distance with another color, for example green. The colors can change according to the at least one specified function in for example a constant, linear, exponential, logarithmic, polynomial and/or any combination thereof way. In the example above it could be a standard color bar ranging from red to orange to yellow to green. But any other colors, color bars and/or color schemes can be used.

Figure 11A:
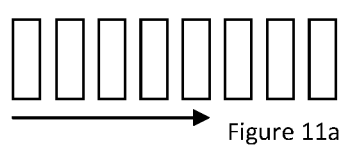
FIGS. 11a-11k show exemplarily different forms of color scales.
Figure 11B:
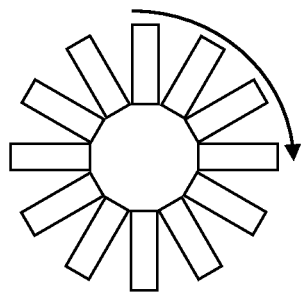
Figure 11C:
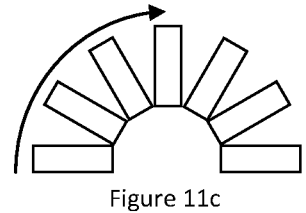
Figure 11D:
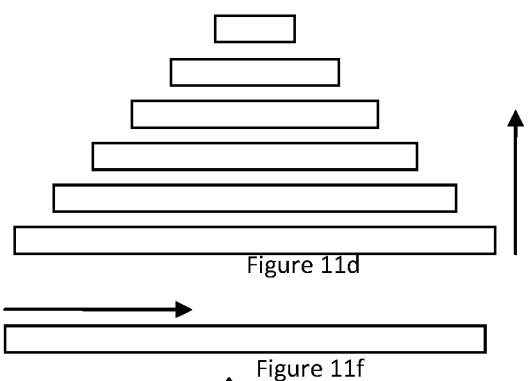
Figure 11E:
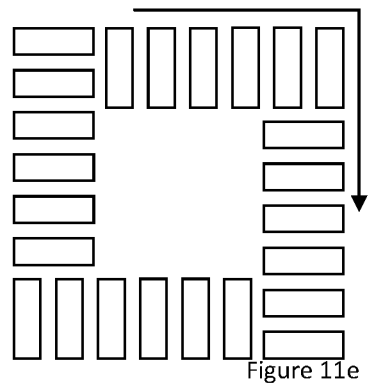
Figure 11F:
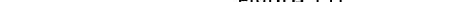
Figure 11G:
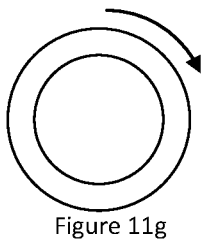
Figure 11H:
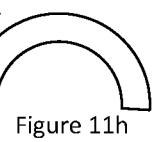
Figure 11I:
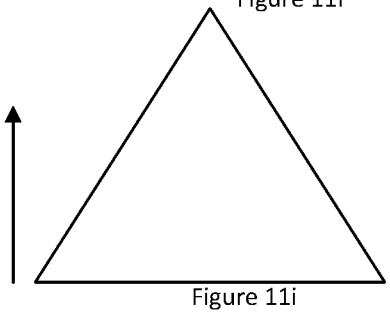
Figure 11J:
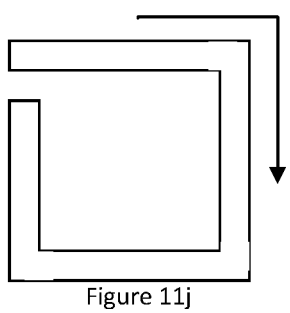
Figure 11K:
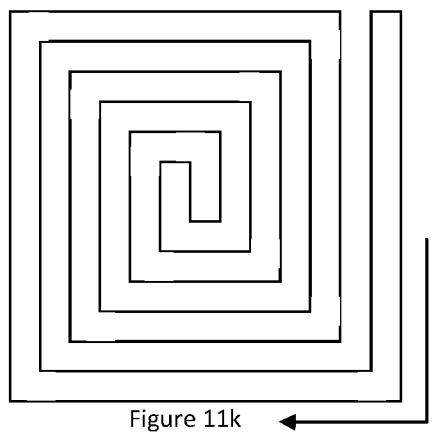

The color scale can take various forms, comprising for example a multitude of elements, for example arranged vertically as shown for stripes in FIG. 11*a*, arranged in a circle as shown for stripes in FIG. 11*b*, arranged in a half-circle as shown for stripes in FIG. 11*c*, arranged in a triangle shape as shown for stripes in FIG. 11*d*, arranged in a rectangular shape as shown for stripes in FIG. 11*e*. The shape of the elements can also vary and is not limited to the shown stripes, comprising for example triangles, circles, squares, 2D and/or 3D representations of 3D objects, for example cubes, boxes, pyramids and many more.

The scale can also comprise just a single element, becoming smaller or larger and/or changing colors. Preferably the single element comprises a continuous changing color scale, of which several possible embodiments are shown in FIGS. 11*f*-11*k*.

At the same time, a number representation of the parameter and/or the parameter range can be displayed next to the scale to increase the perception by the driver. The orientation of the scale can be chosen either horizontal, vertical and/or at any angle in between.

The size, shape color and volume of the graphical representation can also change with the at least one parameter of the vehicle and/or environment, such that for example a single or multiple elements fade away, disappear and/or appear. The arrows shown in the FIGS. 11*a*-11*k* indicates exemplarily the direction of such possible changes.

The graphical representations, for example those shown in FIGS. 11*a*-11*k*, can also be used to be placed adjacent to and/or surrounding a present spotter area of a rear view device, irrespective if an actual mirror or a mirror replacement, such as a display, is used.

In all embodiments the changes can also be carried out on multiple parts and in multiple directions, sequentially or at the same time.

Multiple information can be displayed on a single display device, by splitting the display into at least two parts, one part showing the information of the zoom function, whereas at least one of the other parts can show the normal view and/or part of the normal view A vehicle comprising display devices, processing devices and sensors such as cameras is also described. In or on the vehicle different display devices, processing devices and cameras can be installed, configured and interconnected.

The display devices can be mounted inside or outside the vehicle and can be used to transmit optical information to the driver and/or any person or object inside and outside of the vehicle. The display devices can also be configured to transmit information via haptics, acoustics, odors, chemicals and/or other forms of electromagnetic fields. The information is typically first collected from sensors and other signal receiving devices on or in the vehicle and then processed by processing devices. A multitude or only one processing device can be installed in the vehicle to process the pictures and information provided by the cameras and sensors. Optionally the processing devices can be remotely located and the vehicle is wirelessly connected to the remote processing unit. The processed information is then directed to the different display devices to inform the driver and/or any person or object inside and outside of the vehicle. Depending on the location of the display devices and the nature of the receiver, the output of different information with different output means is induced.

The display devices can also be configured to receive input from the driver and/or any person or object inside and outside of the vehicle. This input can be received via different sensing means, comprising for example photosensitive sensors, acoustic sensors, distance sensors, touch-sensitive surfaces, temperature sensors, pressure sensors, odor detectors, gas detectors and/or sensors for other kind of electromagnetic fields. This input can be used to control or change the status of the output of the display device and/or other components on or in the vehicle. For example the field of view, the contrast, the brightness and/or the colors displayed on the display device, but also the strength of the touch feedback, sound volume and other adjustable parameters can be changed. As further examples the position or focus of a camera, the temperature or lighting inside the vehicle, the status of a mobile device, like a mobile phone, carried by a passenger, the status of a driver assistance system or the stiffness of the suspension can be changed. Generally every adjustable parameter of the vehicle can be changed.

Preferably the information from the sensing means is first processed by a processing device, but it can also be directly processed by the sensor means or the display device comprising a processing device. Preferably the display device comprises a multi-touch display so that the driver or any other passenger can directly react to optical information delivered by the display device by touching specific areas on the display. Optionally gestures, facial expression, eye movement, voice, sound, evaporations, breathing and/or postural changes of the body can also be detected, for example via a camera, and used to provide contact-free input to also control the display device.

Information stemming from multiple sources can be simultaneously displayed on a display of the display device. The information coming from different sources can either be displayed in separated parts of the display or the different information can be displayed side by side or overlaid together on the same part of the display.

Selecting a specific region on the display of the display device by, for example touching it, can trigger different functions depending on the circumstances. For example, a specific function can be activated or deactivated, additional information can be displayed, or a menu can be opened. The menu can offer the choice between different functions, for example the possibility to adjust various parameter.

The adjustment of different parameters via a menu can be done in many ways, known from prior art and especially from the technology used in mobile phones with touch screen technology. Known are for example scrolling or sliding gestures, swiping, panning, pinching, zooming, rotating, single, double or multi tapping, short or long pressing, with one or more than one finger of one or more hands and/or any combination thereof.

A display device in combination with one or more cameras can be used to replace a rearview mirror, either an interior or an exterior rearview mirror. There are various advantages offered by this constellation. For example, a display device together with a camera monitoring one side of the vehicle and one camera monitoring the rear of the vehicle can replace an external rearview mirror. By combining the pictures of both cameras, the blind spot zone is eliminated and an improved visibility is offered.

The display devices can be arranged inside the vehicle eliminating the need for exterior parts. This offers the advantage to smoothen the outer shape of the vehicle, reduces the air friction and therefore offers power and/or fuel savings.

The processing device can advantageously handle the input of multiple sources. Correlating the input data of the different sources allows for the reduction of possible errors, increases measurement accuracy and allows to extract as much information as possible from the available data.

When driving, it is especially important to perceive possibly dangerous situations. One part of the processing device analyses the available data and uses different signaling means to enhance the perception of the situation by the driver. For example, an object recognition and classification algorithm can be used to detect different objects surrounding the vehicle, for example based on the pictures acquired by one or more cameras. Comparing the pictures for different points in time or using supplementary sensor data gives information about the relative movement of objects and their velocity. Therefore, objects can be classified into different categories; for example, dangerous, potentially dangerous, noted for continued observance, highly relevant, relevant, and irrelevant.

From all the information, a level of danger attributed with each object can be derived. Depending on the danger level or other important parameters, the perception of objects for the driver can be enhanced by using different signalling means to display on the display device, for example highlighting the objects with specific colors, increased brightness, flashing messages, warning signs and/or using audio messages. The overall danger level or the highest danger level can also be displayed by special warning signs, like an increased brightness, a colorful border around the whole or specific parts of the display, constant in time or flashing with increasing or decreasing frequency. The information displayed on the display device is highly situational and is re-evaluated according to the updated information from the various sensors and information sources. An emergency vehicle or a station can for example broadcast an emergency message to allow for vehicles and the driver of the vehicles for an improved reaction to possible dangerous situations or to clear the path for emergency operations. A vehicle involved in an accident or dangerous situation can also broadcast a message to call the attention of other vehicles and their drivers to those situations.

The implementations disclosed herein also relate to an object detection and classification system for use in a variety of contexts. The present disclosure contains a novel feature descriptor that combines information relating to what a feature is with information relating to where the feature is located with respect to a query point. This feature descriptor provides advantages over prior feature descriptors because, by combining the "what" with the "where," it reduces the resources needed to detect and classify an object because a single descriptor can be used instead of multiple feature descriptors. The resulting system therefore is more efficient than prior systems, and can more accurately detect and classify objects in situations where hardware and/or software resources are limited.

Figure 12:
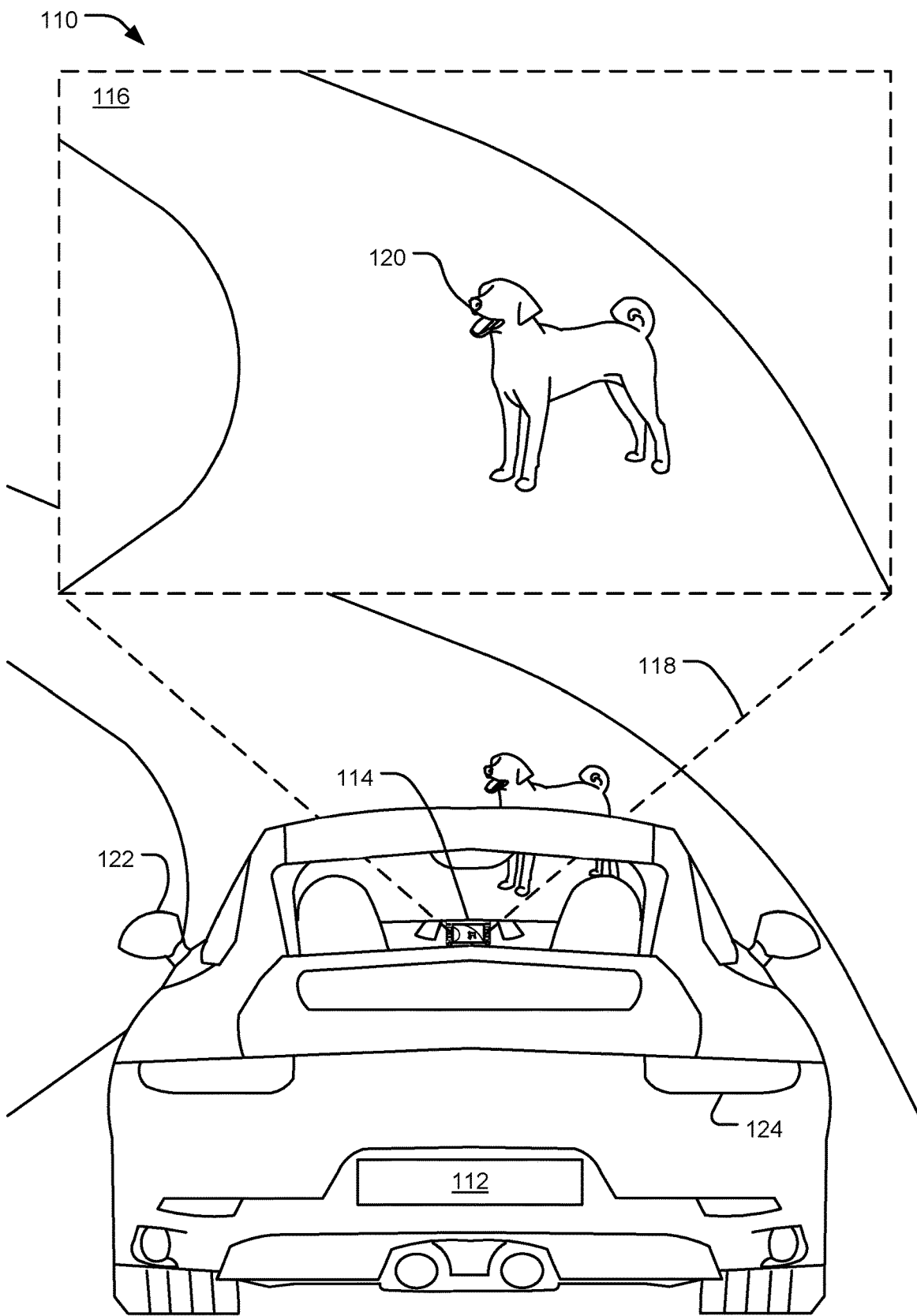
FIG. 12 illustrates a rear view of a vehicle with an object detection and classification system.

FIG. 12 illustrates a rear view of a vehicle 112 with an object detection and classification system 110 according to the present disclosure. The vehicle 112 includes an image sensor 114 to capture an image 116 of the environment surrounding the vehicle 112. The image may include a range of view through an angle 118, thus the image 116 may depict only a portion of the area surrounding the vehicle 112 as defined by the angle 118. The image 116 may include an object 120. The object 120 may be any physical object in the environment surrounding the vehicle 112, such as a pedestrian, another vehicle, a bicycle, a building, road signage, road debris, etc. The object detection and classification system 110 may assign a classification to the object 120. The classification may include the type of road object, whether the object is animate or inanimate, whether the object is likely to suddenly change direction, etc. The object detection and classification system 110 may further assign a range of characteristics to the object 120 such as a size, distance, a point representing the center of the object, a velocity of the object, an expected acceleration range, etc.

The image sensor 114 may be various types of optical image sensors, including without limitation a digital camera, a range finding camera, a charge-coupled device (CCD), a complementary metal oxide semiconductor (CMOS) sensor, or any other type of image sensor capable of capturing continuous real-time images. In an implementation, the vehicle 112 has multiple image sensors 114, each image sensor 114 may be positioned so as to provide a view of only a portion of the environment surrounding the vehicle 112. As a group, the multiple image sensors 114 may cover various views from the vehicle 112, including a front view of objects in the path of the vehicle 112, a rear-facing image sensor 114 for capturing images 116 of the environment surrounding the vehicle 112 including objects behind the vehicle 112, and/or side-facing image sensors 114 for capturing images 116 of object next to or approaching the vehicle 112 from the side. In an implementation, image sensors 112 may be located on various parts of the vehicle. For example, without limitation, image sensors 112 may be integrated into an exterior mirror of the vehicle 112, such as on the driver's exterior side mirror 122. Alternatively, or additionally, the image sensor 112 may be located on the back of the vehicle 112, such as in a rear-light unit 124. The image sensor 112 may be forward-facing and located in the interior rear-view mirror, dashboard, or in the front headlight unit of the vehicle 112.

Upon capture of an image 116 of the environment surrounding the vehicle 112, the object detection and classification system 110 may store the image 116 in a memory and perform analysis on the image 116. One type of analysis performed by the object detection and classification system 110 on the image 116 is the identification of keypoints and associated keypoint data. Keypoints, also known as interest points, are spatial locations or points in the image 116 that define locations that are likely of interest. Keypoint detections methods may be supplied by a third party library, such as the SURF and FAST methods available in the OpenCV (Open Source Computer Vision) library. Other methods of keypoint detection include without limitation SIFT (Scale-Invariant Feature Transform). Keypoint data may include a vector to the center of the keypoint describing the size and orientation of the keypoint, and visual appearance, shape, and/or texture in a neighborhood of the keypoint, and/or other data relating to the keypoint.

A function may be applied to a keypoint to generate a keypoint value. A function may take a keypoint as a parameter and calculate some characteristic of the keypoint. As one example, a function may measure the image intensity of a particular keypoint. Such a function may be represented as $f(z_k)$, where $f$ is the image intensity function and $z_k$ is the $k^{th}$ keypoint in an image. Other functions may also be applied, such a visual word in a visual word index.

Figure 13:
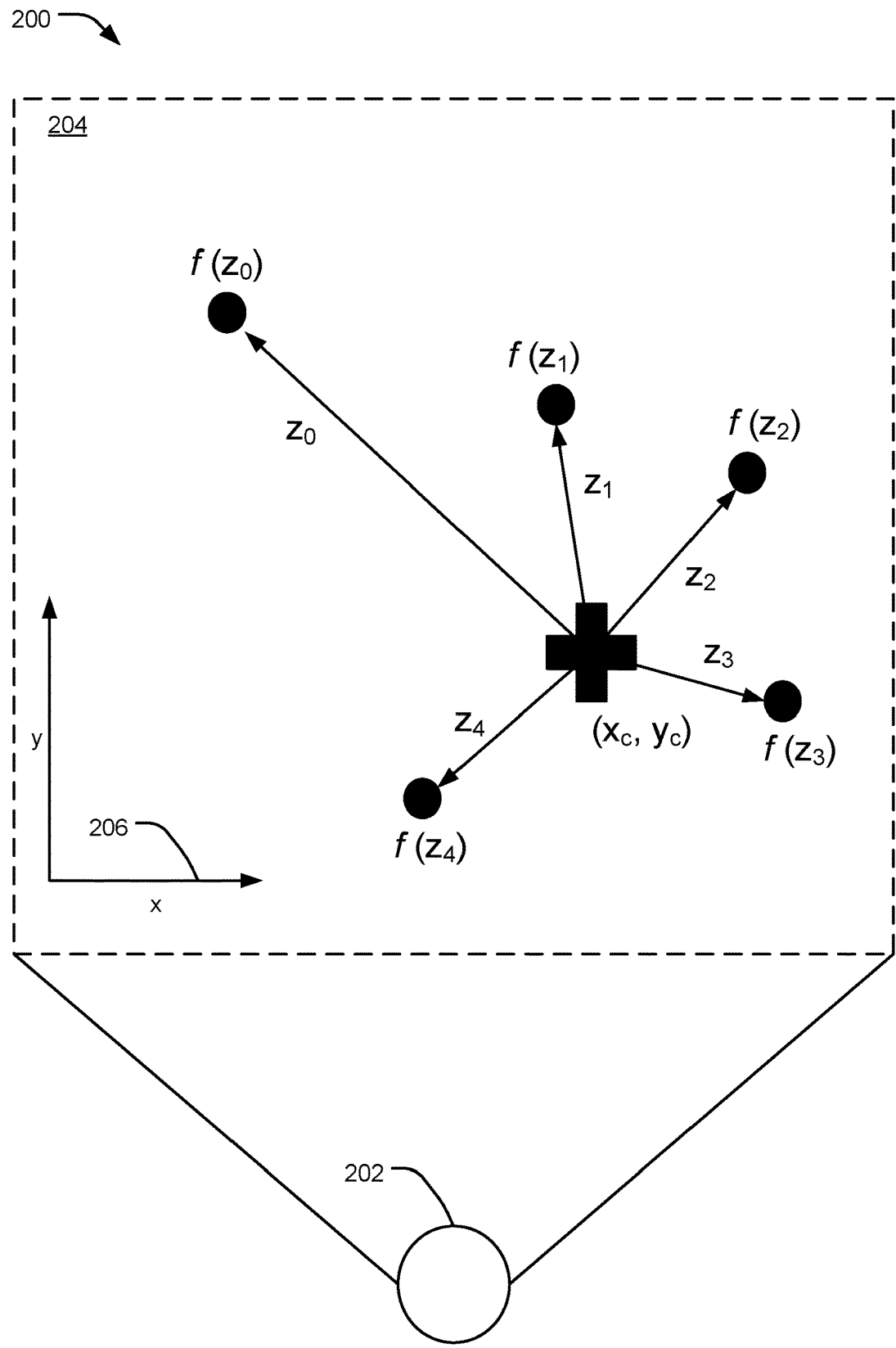
FIG. 13 illustrates a schematic of an image capture with a query point and a plurality of keypoints.

FIG. 13 illustrates a schematic diagram 200 of an image capture 204 taken by an image sensor 202 on a vehicle. The image capture 204 includes a query point $(x_c, y_c)$ and a plurality of keypoints $z_0$-$z_4$. A query point is a point of interest that may or may not be a keypoint, for which the object detection and classification system may choose for further analysis. In an implementation, the object detection and classification system may attempt to determine whether a query point is the center of an object to assist in classification of the object.

Points in the image capture 204 may be described with reference to a Cartesian coordinate system; wherein each point is represented by an ordered pair, the first digit of the pair referring to the point's position along the horizontal or x-axis, and the second digit of the pair referring to the point's position along the vertical or y-axis. The orientation of the horizontal and vertical axes with respect to the image 204 is shown by the axis 206. Alternatively, points in the image capture 204 may be referred to with complex numbers where each point is described in the form x+iy wherein $i=\sqrt{(-1)}$. In another implementation, a query point may serve as the origin of a coordinate system, and the locations of keypoints relative to the query point may be described as vectors from the query point to each of the keypoints.

The image detection and classification system 110 uses a new descriptor function, to produce an evaluation of a query point in an image 204 that combines a representation of what the feature is and where the feature is located in relation to the query point into a single representation. For any image 204 with a set of keypoints $z_0$-$z_4$ in the neighborhood of a query point $(x_c, y_c)$, the descriptor for the query point is as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the vehicle in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$.

To obtain a descriptor that is invariant to scale and orientation, Equation (1) may be modified by letting $z_m$ be the mean value of $z_k$ values:

$$z_m = \frac{1}{N}\sum_{k=0}^{N-1}(z_k - z_c)$$

By dividing the right-hand side of Equation (1) by $|z_m|$, a scale invariant version of the descriptor is obtained. On the other hand, by dividing both sides of Equation (1) by $$\frac{z_m}{|z_m|}$$

a rotation-invariant version the descriptor is obtained. In order to write a descriptor that is invariant in both scale and orientation, dividing by $z_m$ yields the following descriptor:

$$F(\zeta) = \frac{1}{z_m} \sum_{k=0}^{N-1} (z_k - z_c) e^{i2\pi f(z_k)\zeta}$$

The division by N is omitted from Equation (3) since the contribution of the keypoint number is already neutralized through the division by $z_m$. Due to the similarity of Equation (3) to the formula for the Inverse Fourier Series, Equation (3) may be referred to herein as a Fourier Fan.

Since Equation (3) is a function of a continuous variable it may be sampled for use in the object detection and classification system 100. In an implementation, a sampling frequency greater than 2max($f$) may be chosen where max( ) indicates the maximum value of the function $f$. Another characteristic of Equation (3) is that it is infinite over the domain of the variable $\zeta$. Sampling an infinite equation will result in an infinite number of samples, which may not be practical for use in the object detection and classification system 100. If Equation (3) is a periodic function, however, then it would be sufficient to sample only a single period of Equation (3), and to ignore the remaining periods. In an implementation, Equation (3) is made to be periodic by requiring all values of the function $f$ to be integer multiples of a single frequency $f_0$. As such, for Equation (3) to be able to be sampled, the function $f$ must have a known maximum, and for the Equation (3) to be periodic, the function $f$ must be quantized such that the values of $f$ are integer multiples of $f_0$.

In an implementation, the function $f$ may represent more than a simple feature, such as the image intensity. Instead, the function $f$ may be a descriptor function of each of the keypoints, such as those referred to herein (e.g., SIFT and/or SURF descriptors). Such descriptors are usually not simple scalar values, but rather are more likely to be high dimensional feature vectors, which cannot be incorporated directly in Equation (3) in a trivial manner. It is, however, possible to incorporate complex descriptors as feature values by clustering the descriptors in an entire set of training data and to use the index of the corresponding cluster as the value for $f$. Such cluster centers may be referred to as "visual words" for $f$. Let $f_k$ be the descriptor for a keypoint k, if $f_k$ takes integer values, e.g., 3, then there is a descriptor at the keypoint located at $z_k$-$z_c$, which can be assigned to cluster 3. It should be appreciated that, in this example, $f$ is quantized and the number of clusters is the function's maximum which is known. These characteristics are relevant because they are the characteristics of $f$ needed to make Equation (3) able to be sampled and periodic.

In an implementation, an order is imposed on the visual word cluster centers, such that the output of $f$ is not a categorical value. In other words, without an order, the distance between cluster 2 and cluster 3 is not necessarily less than the distance between cluster 2 and cluster 10 because the numerical values are merely identifiers for the clusters. An order for the visual words may be imposed using multidimensional scaling (MDS) techniques. Using MDS, one can find a projection into a low dimensional feature space from a high dimensional feature space such that distances in the low dimensional feature space resemble as much as possible distances in the high dimensional feature space. Applied to the visual words using MDS, the cluster centers may be projected into a one dimensional space for use as a parameter for f. In one implementation, a one dimensional feature space is chosen as the low dimensional feature space because one dimensional space is the only space in which full ordering is possible.

The object detection and classification system may be tuned according to a set of training data during which parameters for the system may be chosen and refined. For example, descriptor values and types may be chosen, the size of the neighborhood around a query point may be set, the method of choosing keypoints, the number of keypoints chosen per image, etc. may also be chosen. Since the tuning of the object detection and classification system is a type of machine learning, it may be susceptible to a problem known as "overfitting." Overfitting manifests itself when machine classifiers over-learn the training data leading to models which do not generalize well on other data, the other data being referred to herein as "test data." In the descriptor of Equation (3), overfitting could occur if, on training data, the object detection and classification system overfits the positions of the keypoints with respect to the query point. Changes in the positions of the keypoints that are not present in training data, which could occur due to noise and intra-class variance, will not always be handled well by the object detection and classification system when acting on test data. To address the issue of overfitting, at each query point ($x_c$, $y_c$), instead of extracting a single Fourier Fan Equation (3) on training data, multiple random Fans may be extracted, denoted by the set $M_f$ (e.g., $15_f$). Each of the random Fans contains only a subset of the available N keypoints in the neighborhood of the query point ($x_c$, $y_c$). Later, when the object detection and classification system is running on test data, the same set $M_f$ of random Fourier Fans is extracted, and the result is confirmed according to majority agreement among the set of random Fourier Fans. Random Fourier Fans also allow the object detection and classification system to learn from a small number of images since several feature vectors are extracted at each object center.

In the comparison of Equation (3), the "Fourier Fan," to the formula for the inverse Fourier Series, it should be understood that there are some differences between the two. For example, only those frequencies that belong to the neighborhood of a query point are available for each Fourier Fan. As another example, shifting all coefficients $z_k$ by a constant $z_a$, i.e. a shift of the object center, is not equivalent to adding a Dirac impulse in the domain $\zeta$ even if it is assumed that the same keypoints are available in the new query point neighborhood. This is true because the addition of $z_a$ is not a constant everywhere, but only to the available frequencies, and zero for the other frequencies.

Figure 14:
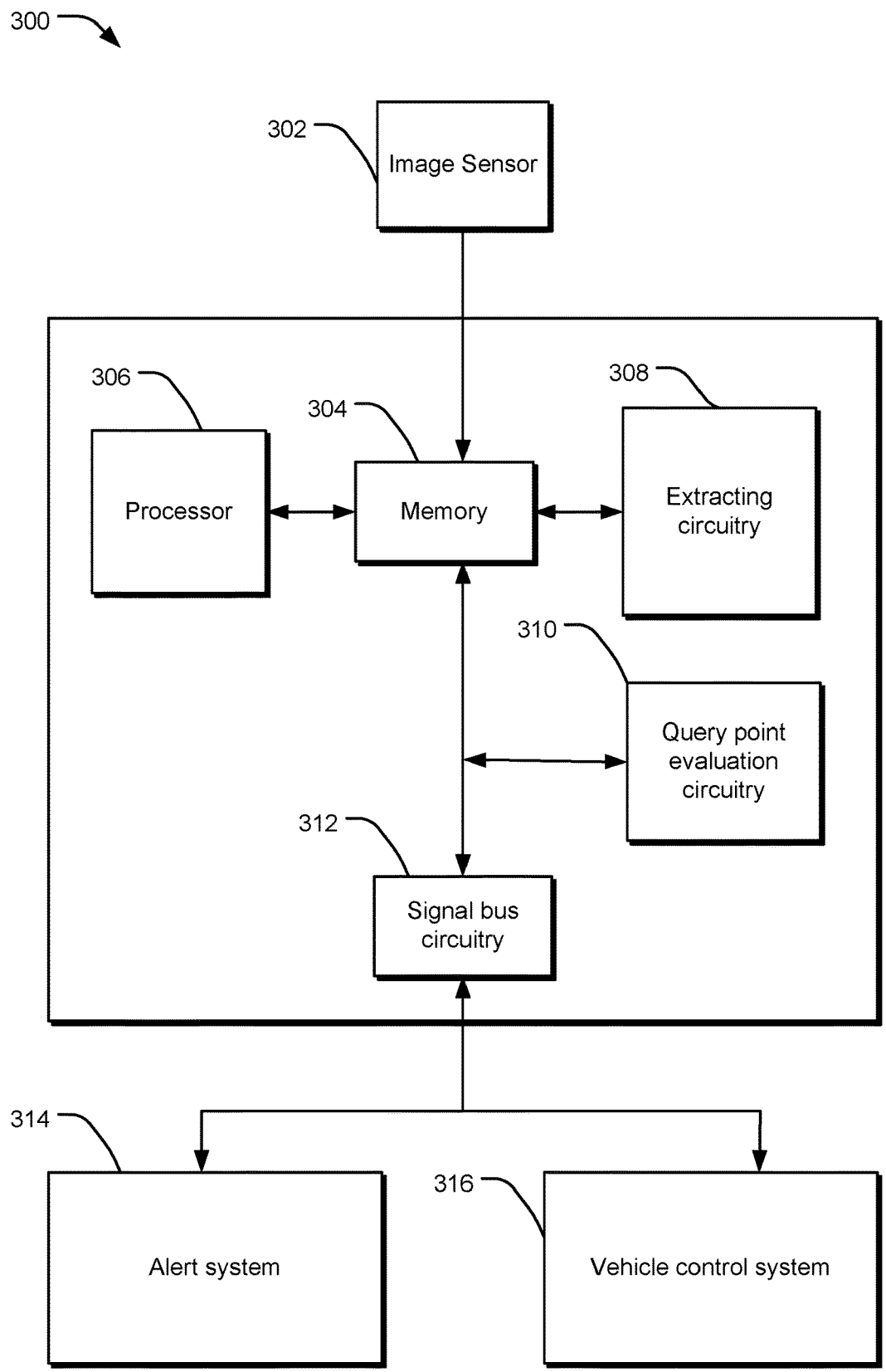
FIG. 14 illustrates a block diagram of a system that may be useful in implementing the implementations disclosed herein.

FIG. 14 illustrates a block diagram of an object detection and classification system 300 that may be useful for the implementations disclosed herein. The object detection and classification system 300 includes an image sensor 302 directed at the environment surrounding a vehicle. The image sensor 302 may capture images of the environment surrounding the vehicle for further analysis by the object detection and classification system 300. Upon capture, an image from the environment surrounding a vehicle may be stored in the memory 304. The memory 304 may include volatile or non-volatile memory and may store images captured by the image sensor as well as data produced by analysis of the images captured by the image sensor. A processor 306 may carry out operations on the images stored in memory 304. The memory 304 may also store executable program code in the form of program modules that may be executed by the processor 306. Program modules stored on the memory 304 include without limitation, hazard detection program modules, image analysis program modules, lens obstruction program modules, blind spot detection program modules, shadow detection program modules, traffic sign detection program modules, park assistance program modules, collision control and warning program modules, etc.

The memory 304 may further store parameters and settings for the operation of the object detection and classification system 300. For example, parameters relating to the training data may be stored on the memory 304 including a library of functions $f$ and keypoint settings for computation and calculation of Random Fourier Fans. The memory 304 may further be communicatively coupled to extracting circuitry 308 for extracting keypoints from the images stored on the memory 304. The memory 304 may further be communicatively coupled to query point evaluation circuitry 310 for taking image captures with keypoints and associated keypoint data and evaluating the images with keypoints and keypoint data according to Fourier Fans to produce sampled Fourier Fan values.

If the sampled Fourier Fan values produced by the query point evaluation circuitry 310 meet a potential hazard condition, then signal bus circuitry 312 may send a signal to an alert system 314 and/or a vehicle control system 316. Sampled Fourier Fan values may first be processed by one or more program modules residing on memory 304 to determine whether the sampled values meet a potential hazard condition. Examples of sampled values that may meet a potential hazard condition are an object determined to be a collision risk to the vehicle, an object that is determined to be a vulnerable road user that is at risk of being struck by the vehicle, a road sign object that indicates the vehicle is traveling in the wrong part of a road or on the wrong road, objects that indicate a stationary object that the vehicle might strike, objects that represent a vehicle located in a blind spot of the operator of the vehicle.

If the sampled values of a Fourier Fan function satisfy a potential hazard condition, the signal bus circuitry 312 may send one or more signals to the alert system 314. In an implementation, signals sent to the alert system 312 include acoustic warnings to the operator of the vehicle. Examples of acoustic warnings include bells or beep sounds, computerized or recorded human language voice instructions to the operator of the vehicle to suggest a remedial course of action to avoid the cause the of sample value meeting the potential hazard condition. In another implementation, signals sent to the alert system 314 include tactile or haptic feedback to the operator of the vehicle. Examples of tactile or haptic feedback to the operator of the vehicle include without limitation shaking or vibrating the steering wheel or control structure of the vehicle, tactile feedback to the pedals, such as a pedal that, if pushed, may avoid the condition that causes the sample value of the Fourier Fan to meet the potential hazard condition, vibrations or haptic feedback to the seat of the driver, etc. In another implementation, signals sent to the alert system 314 include visual alerts displayed to the operator of the vehicle. Examples of visual alerts displayed to the operator of the vehicle include lights or indications appearing on the dashboard, heads-up display, and/or mirrors visible to the operator of the vehicle. In one implementation, the visual alerts to the operator of the vehicle include indications of remedial action that, if taken by the operator of the vehicle, may avoid the cause of the sample value of the Fourier Fan meeting the potential hazard condition. Examples of remedial action, include an indication of another vehicle in the vehicle's blind spot, an indication that another vehicle is about to overtake the vehicle, an indication that the vehicle will strike an object in reverse that may not be visible to the operator of the vehicle, etc.

In another implementation, if the sampled values of a Fourier Fan function satisfy a potential hazard condition, the signal bus circuitry 312 may send one or more signals to the vehicle control system 316. Examples of signals sent to the vehicle control system 316 include signals to the steering system to alter the direction of the vehicle in an attempt to avoid the object that is the cause of the sampled values of the Fourier Fan function to satisfy the potential hazard condition. In another implementation, a signal sent to the vehicle control system 316 may include signals to sound the horn of the vehicle to alert the object that caused the sample values of the Fourier Fan function to satisfy the hazard condition that the vehicle with the object detection and classification system is present. In yet another implementation, the signal sent to the vehicle control system 316 include a signal to engage the brakes of the vehicle to avoid a collision with the detected object.

Figure 15:
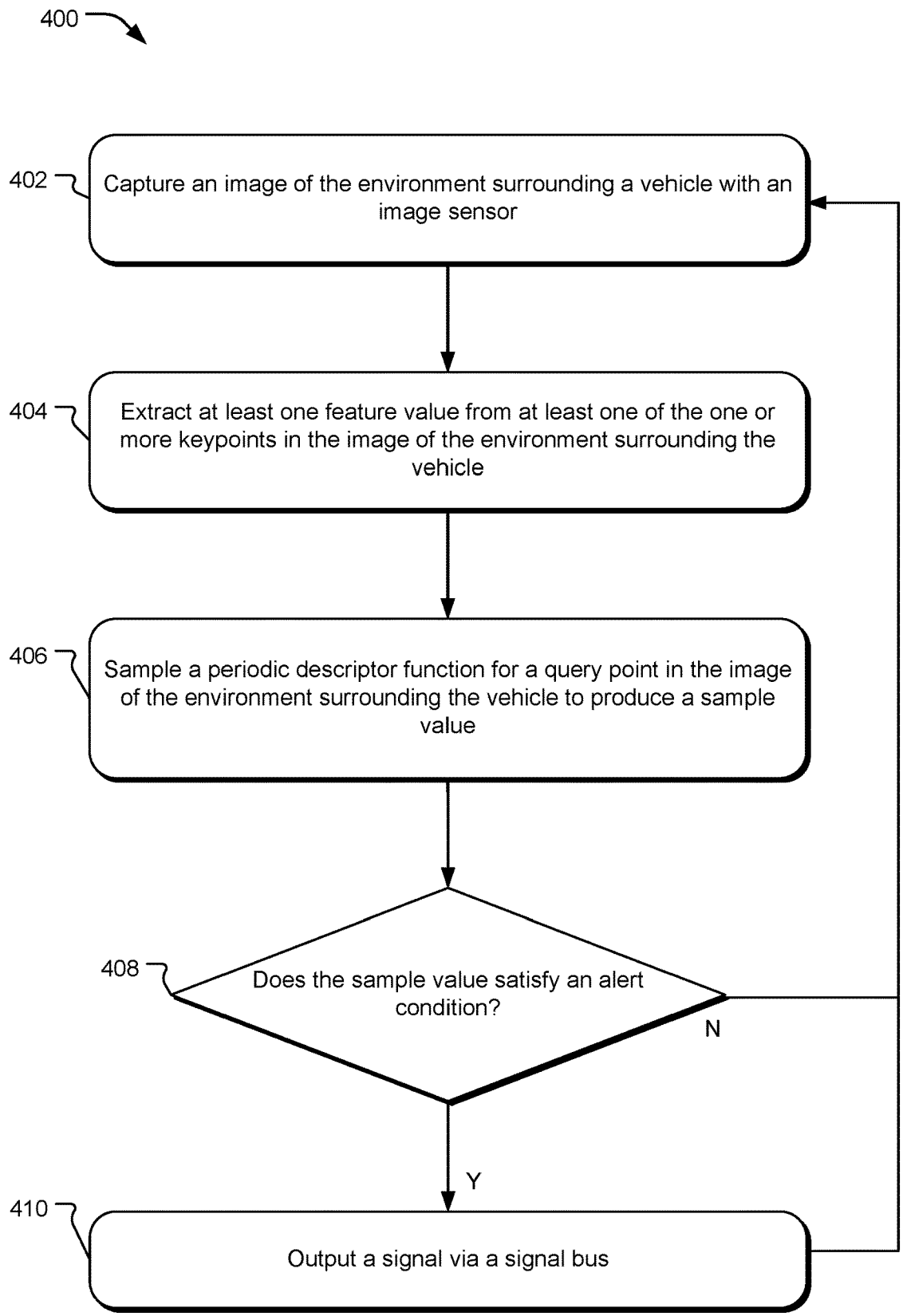
FIG. 15 illustrates example operations for detecting and classifying an object and transmitting a signal to an alert system and/or to a vehicle control system.

FIG. 15 illustrates example operations 400 for detecting and classifying an object and outputting a signal if a sample value of a Fourier Fan meets a potential hazard condition. A capturing operation 402 captures an image from the environment surrounding a system with an image sensor, the image from the environment surrounding the system having one or more keypoints. The image from the environment surrounding the system may be captured by an image sensor mounted anywhere on the system. In one implementation, the system is a vehicle. The captured image may be stored in a memory in an object detection and classification system. Once stored, a processor may execute a keypoint detection program module to identify the keypoints. Alternatively, or additionally, extracting circuitry may identify the keypoints in the image. The keypoints may be identified according to a number of methods, such as methods provided by third party libraries, and data parameters for the methods, such as the number of keypoints to extract or conditions for a keypoint extraction may be stored on the memory in the object detection and classification system.

Extracting operation 404 extracts at least one feature value from at least one of the one or more keypoints in the image from the environment surrounding the system. A processor may execute a feature value extraction program module to extract the features values of keypoints. Alternatively, or additionally, extracting circuitry may extract the feature values of keypoints in the stored image. The feature value of a keypoint may be determined according to a function $f$ In some embodiments, the function $f$ may have certain characteristics for use in a Fourier Fan Equation: having a known maximum, such that a sampling rate may be set to $2\max(f)$, and being periodic, such that only one period of $f$ need be sampled.

Sampling operation 406 samples a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the vehicle. In an implementation, the sampled periodic descriptor function in sampling operation 406 is Equation (3).

At decision block 408, if the sample value of the periodic descriptor function does not meet a potential hazard condition, then the method ends or returns to capturing operation 402. If the sample value of the periodic descriptor function does meet a potential hazard condition, then outputting operation 410 sends a signal via a signal bus. The signal sent via the signal bus in outputting operation 410 may be to an alert system of a vehicle, which may display an acoustic or visual signal to the operator of the vehicle regarding the object that is the cause of the sample value exceeding the potential hazard condition. In another embodiment, the signal bus sends at outputting operation 410 a signal to a vehicle control system. The system sent to the vehicle control system may cause the vehicle to change speed or direction without intervention from the operator of the vehicle to avoid a collision with the object that caused the sample value to exceed the potential hazard condition.

Figure 16:
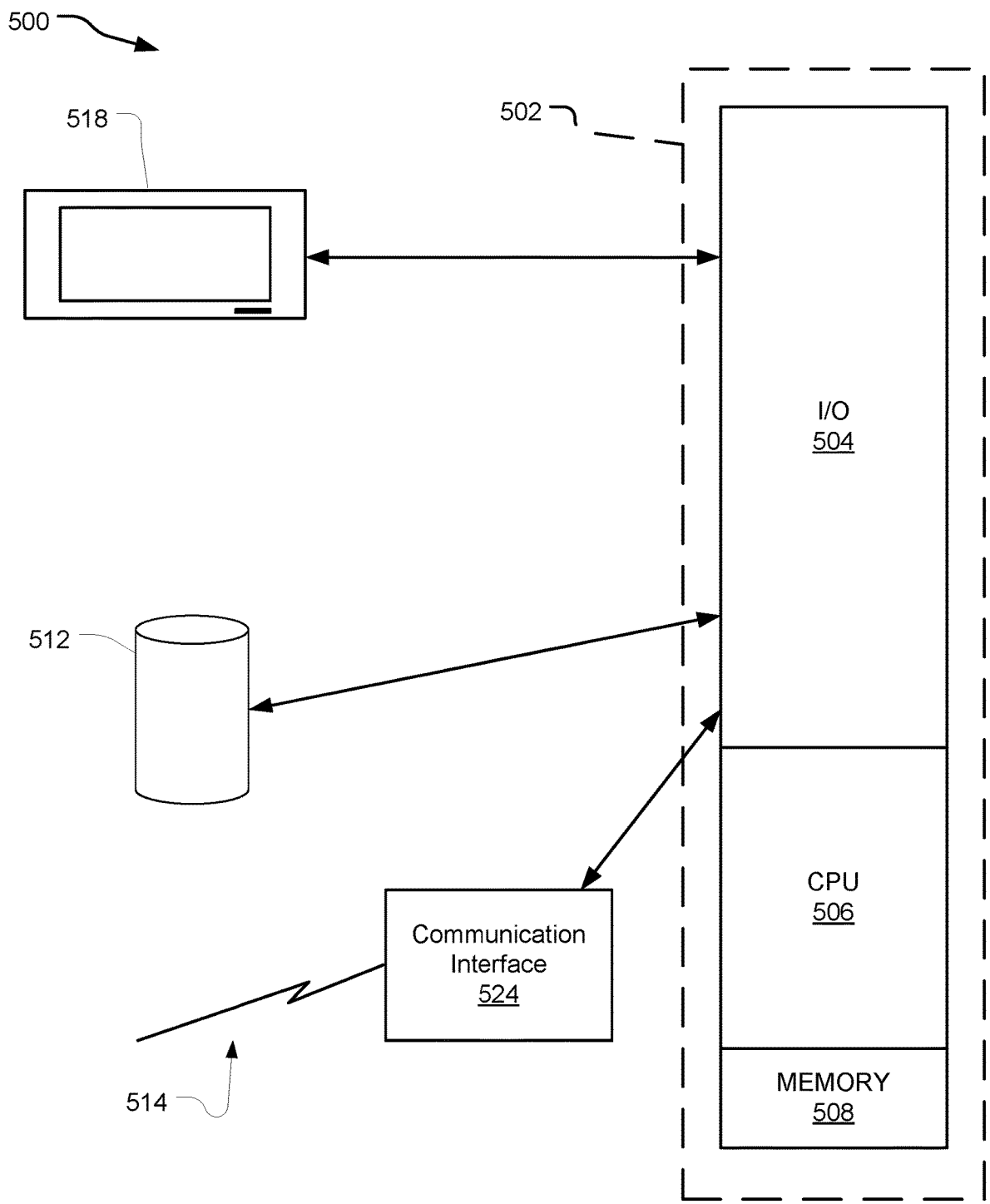
FIG. 16 discloses a block diagram of an example processor system suitable for implementing one or more aspects of an object detection and classification system with Fourier fans.

FIG. 16 discloses a block diagram of a processor system 500 suitable for implementing one or more aspects of an object detection and classification system with Fourier Fans. The processor system 500 is capable of executing a processor program product embodied in a tangible processor-readable storage medium. Data and program files may be input to the processor system 500, which reads the files and executes the programs therein using one or more processors. Some of the elements of a processor system 500 are shown in FIG. 16 wherein a processor 502 is shown having an input/output (I/O) section 504, a Central Processing Unit (CPU) 506, and a memory section 508. There may be one or more processors 502, such that the processor 502 of the computing system 500 comprises a single central-processing unit 506, or a plurality of processing units. The processors may be single core or multi-core processors. The described technology is optionally implemented in software loaded in memory 508, a disc storage unit 512, and/or communicated via a wired or wireless network link 514 on a carrier signal (e.g., Ethernet, 3G wireless, 5G wireless, LTE (Long Term Evolution)) thereby transforming the processing system 500 in FIG. 16 to a special purpose machine for implementing the described operations. The disc storage unit 512 may include volatile memory, non-volatile memory, solid state memory, flash memory, hybrid, and/or traditional magnetic rotating data storage media.

The I/O section 504 may be connected to one or more user-interface devices (e.g., a mobile device, a touch-screen display unit 518, etc.) or the disc storage unit 512. Processor program products containing mechanisms to effectuate the systems and methods in accordance with the described technology may reside in the memory section 508 or on the storage unit 512 of such a system 500.

A communication interface 524 is capable of connecting the processor system 500 to an enterprise network via the network link 514, through which the processor system 500 can receive and/or send instructions and data embodied in a carrier wave. The communication interface 524 may receive signals and data representing an image from the environment surrounding the system via an image sensor. The communication interface may send signals from the processor system 500 to the image detection and classification system including without limitation audible alert signals sent to the operator of a vehicle, data signals sent to a HUD (heads-up-display) visible to the operator of a vehicle, a video screen such as display 518 that is visible to the operator of a vehicle for display of information regarding objects and/or alerts, a vehicle control signal for altering the control of a vehicle to avoid a hazard, etc.

When used in a local area networking (LAN) environment, the processor system 500 is connected (by wired connection or wirelessly) to a local network through the communication interface 524, which is one type of communications device. When used in a wide-area-networking (WAN) environment, the processor system 500 typically includes a modem, a network adapter, or any other type of communications device for establishing communications over the wide area network. In a networked environment, program modules depicted relative to the processor system 500 or portions thereof, may be stored in a remote memory storage device. It is appreciated that the network connections shown are examples of communications devices for, and other means of, establishing a communications link between the processor and other devices may be used.

In an example implementation, a network agent of an enterprise network may be embodied by instructions stored in memory 508 and/or the storage unit 512 and executed by the processor 502. Further, local computing systems, remote data sources and/or services, and other associated logic represent firmware, hardware, and/or software, which may be configured to transmit data outside of the enterprise network via the network agent. The network agent of the enterprise network may be implemented using a general purpose computer and specialized software (such as a server executing service software), a special purpose computing system and specialized software (such as a mobile device or network appliance executing service software), or other computing configurations. In addition, data-selection policies and data transmission preparation policies may be stored in the memory 508 and/or the storage unit 512 and executed by the processor 502.

An example system includes an image sensor mounted on a system and configured to capture an image from the environment surrounding the system, the image from the environment surrounding the system including one or more keypoints, extracting circuitry configured to extract at least one feature value from at least one of the one or more keypoints in the image from the environment surrounding the system, query point evaluation circuitry communicatively coupled to the image sensor and the extracting circuitry and configured to classify an object by sampling a periodic descriptor function for a query point in the image from the environment surrounding the system to produce a sample value, the periodic descriptor function depending on the distance between at least one of the one or more keypoints and the query point in complex space, the periodic descriptor function further depending on at least one feature value extracted from at least one of the one or more keypoints in the image from the environment surrounding the system, and a signal bus configured to transmit a signal to the operator of the system if the sample value satisfies an alert condition.

An example system of any preceding system includes that the periodic descriptor function is defined as follows:

$$F(\zeta) = \frac{1}{N}\sum_{k=0}^{N-1}(z_k - z_c)e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$.

An example system of any preceding system includes that the periodic descriptor function is a scale-invariant or rotation-invariant function defined as follows:

$$F(\zeta) = \frac{1}{z_m} \sum_{k=0}^{N-1} (z_k - z_c) e^{i2\pi f(z_k)\zeta}$$

wherein:

$$z_m = \frac{1}{N} \sum_{k=0}^{N-1} (z_k - z_c).$$

An example system of any preceding system includes the signal transmitted to the operator of the system is an audible alert.

An example system of any preceding system includes the signal transmitted to the operator of the system is a visual alert.

An example system of any preceding system includes the signal transmitted to the operator of the system includes haptic feedback.

An example system of any preceding system includes the at least one feature value includes a visual appearance feature.

An example system of any preceding system includes the at least one feature value includes a visual word index in a dictionary of visual words, the visual word index having an order relation determined by multi-dimensional scaling.

An example system of any preceding system includes the feature values of the $k^{th}$ keypoint are integer multiples of a single frequency $f_0$.

An example system of any preceding system includes the query point evaluation circuitry is further configured to sample a plurality of randomized descriptor functions, each randomized descriptor function including only a subset of the one or more keypoints.

An example system of any preceding system includes that the system is a vehicle.

An example system of any preceding system includes that the signal to the system is a vehicle control signal.

An example system includes means for capturing an image from the environment surrounding a system with an image sensor, the image from the environment surrounding the system having one or more keypoints. The example system further includes means for extracting at least one feature value from at least one of the one or more keypoints in the image from the environment surrounding the system. The example system further includes means for sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system. The example system further includes means for outputting an alert signal via a signal bus if the sample value satisfies an alert condition.

An example method includes capturing an image from the environment surrounding a system with an image sensor, the image from the environment surrounding the system having one or more keypoints, extracting at least one feature value from at least one of the one or more keypoints in the image from the environment surrounding the system, sampling a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting an alert signal via a signal bus if the sample value satisfies an alert condition.

An example method of any preceding method includes that the periodic descriptor function is defined as follows:

$$F(\zeta) = \frac{1}{N} \sum_{k=0}^{N-1} (z_k - z_c) e^{i2\pi f(z_k)\zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$.

An example method of any preceding method includes that the alert signal results in an audible alert.

An example method of any preceding method includes that the alert signal results in a visual alert.

An example method of any preceding method includes that the alert signal results in haptic feedback to the operator of the system.

An example method of any preceding method includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example method of any preceding method includes that the feature values of the $k^{th}$ keypoint are integer multiples of a single frequency $f_0$.

An example method of any preceding method includes that the periodic descriptor function is a scale-invariant or rotation-invariant function defined as follows:

$$F(\zeta) = \frac{1}{z_m} \sum_{k=0}^{N-1} (z_k - z_c) e^{i2\pi f(z_k)\zeta}$$

wherein:

$$z_m = \frac{1}{N} \sum_{k=0}^{N-1} (z_k - z_c).$$

An example method of any preceding method includes that the sampling operation includes sampling a plurality of randomized descriptor functions, each randomized descriptor function including only a subset of the one or more keypoints.

An example system includes an image sensor mounted on a system and configured to capture an image from the environment surrounding the system, the image from the environment surrounding the system including one or more keypoints, one or more processors, and a memory storing processor-executable instructions to perform the operations of: extracting, by the processor, at least one feature value from at least one of the one or more keypoints in the image from the environment surrounding the system; sampling, by the processor, a periodic descriptor function for a query point in the image from the environment surrounding the system to produce a sample value to classify an object, the periodic descriptor function depending on the distance between at least one of the one or more keypoints and the query point in complex space, the periodic descriptor function further depending on at least one feature value extracted from at least one of the one or more keypoints in the image from the environment surrounding the system, and outputting, by the processor, an alert signal via a signal bus if the sample value satisfies an alert condition.

An example system of any preceding system includes that the periodic descriptor function is defined as follows:

$$F(\zeta) = \frac{1}{N} \sum_{k=0}^{N-1} (z_k - z_c) e^{i 2\pi f(z_k) \zeta}$$

where N is the number of keypoints in the image from the environment surrounding the system in the neighborhood of the query point, $z_c$ is the query point represented in complex space, $z_k$ is the $k^{th}$ keypoint, $f(z_k)$ is the feature value of the $k^{th}$ keypoint, and $\zeta$ is the continuous independent variable of the descriptor function $F(\zeta)$.

An example system of any preceding system includes that the alert signal results in an audible alert.

An example system of any preceding system includes that the alert signal results in a visual alert.

An example system of any preceding system includes that the alert signal results in haptic feedback to the operator of the system.

An example system of any preceding system includes that the at least one feature includes an image intensity.

An example method of any preceding method includes that the at least one feature value includes a visual word index in a dictionary of visual words.

An example method of any preceding method includes that the visual word index has an order relation determined by multi-dimensional scaling.

An example system of any preceding system includes that the feature values of the $k^{th}$ keypoint are integer multiples of a single frequency $f_0$.

An example system of any preceding system includes that the periodic descriptor function is a scale-invariant or rotation-invariant function defined as follows:

$$F(\zeta) = \frac{1}{z_m} \sum_{k=0}^{N-1} (z_k - z_c) e^{i 2\pi f(z_k) \zeta}$$

wherein:

$$z_m = \frac{1}{N} \sum_{k=0}^{N-1} (z_k - z_c).$$

An example system of any preceding system includes the sampling operation includes sampling a plurality of randomized descriptor functions, each randomized descriptor function including only a subset of the one or more keypoints.

The implementations described herein may be implemented as processor-implemented methods, with circuitry such as ASIC designs, or any combination thereof. The system described herein may include a variety of tangible computer-readable storage media and intangible computer-readable communication signals. Tangible computer-readable storage can be embodied by any available media that can be accessed by the object detection and classification system and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions executable by a processor, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the object detection and classification system. In contrast to tangible computer-readable storage media, intangible computer-readable communication signals may embody computer readable instructions executable by a processor, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

A rearview device is a type of device generally fulfilling the legal requirements for rear view devices in vehicles, preferably motor vehicles. Therefore such a rear view device provides an image of the rear area, substantially as provided for example in the state-of-the-art using an interior mirror or a camera system and a display device, and of the lateral and backside areas lying diagonal to the sides, substantially as provided for example in the state-of-the-art using external rearview mirrors or camera systems and display devices, the image satisfying at least the legal requirements.

Such a rearview device within the subgroup of devices for indirect view and as such the tasks, aims and the solutions described in this invention can also be used for indirect view devices. Examples are images and views of objects which are not in the field of view of the driver, i.e. the directions opposing, left, right, below and above of the viewing direction, but also the view along the direction of the viewing direction of the driver and/or any combinations of the directions can be comprised. The view of the driver can be insufficient in particular also in the viewing direction, for example the view can be obstructed by vehicle parts of the vehicle itself, such as for example parts of the vehicle body, in particular the A-pillar, the roof construction and/or the engine hood, and the view can be obstructed by other vehicles and/or objects outside of the vehicle, obstructing the view in such a way that the driver can perceive the situation not completely satisfyingly or only incompletely. Additionally, it is possible that the driver is not able to perceive the situation in or beside the viewing direction in such a way to allow him to control the vehicle according to the present situation. Therefore, a rearview device can be adapted to reprocess the information according to the abilities of the driver to allow for a best possible perception of the situation.

It is also one aspect of the present invention to provide a rearview device which can operate outside of the legal requirements and which can then be admitted for operation either by exceptional permissions or an adaption of the legal requirements. Such a rearview device can be especially inventiveness since it provides a solution outside of the predefined well known framework.

The rearview device can also be equipped with different illumination devices.

Different functions and devices can be incorporated into and/or controlled with the help of rearview devices, comprising especially also cameras.

Especially useful are functions and devices to enhance, extend and/or sustain the functionality of the rearview device during normal or extreme conditions. This can comprise heating and/or cooling means, cleaning means such as wipers, liquid and/or gaseous sprays, actuator means for moving the rearview device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of rearview devices comprise also illumination devices, for example any kind of light module like an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rearview devices can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rearview device comprising an illumination device fulfilling the brake light functions is disclosed in German patent application No. 102012108488, filed on Sep. 11, 2012 for REARVIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rearview device is disclosed in German patent application No. 102012107833, filed on Aug. 24, 2012 for ILLUMINATION DEVICE AND REARVIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rearview device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rearview device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further, a light guiding device for an illumination device, in particular for a motor vehicle or a display device, in a rearview device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rearview device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rearview device or a footwell device of a vehicle, comprising at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rearview device of a motor vehicle, comprising a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can comprise in particular a plurality of different optical elements, comprising a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REARVIEW ASSEMBLY WITH CAMERA AND LENS WIPING SYSTEM, which are all hereby incorporated herein by reference.

The camera can comprise for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It comprises for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semi-transparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992 filed on Jan. 7, 2005 for CHARGE CONDUCTING MEDIUM_and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. No. 7,999,992 and U.S. Pat. No. 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also comprise cleaning elements to clean the optical element facing outwards and being exposed to the environment. The cleaning element can for example comprise wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example comprise any fabric, elastomeric, sponge, brush, or combination of these. Special wiper elements comprising wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

Alternatively, the housing can be made of a body comprising plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can comprise a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug. 19, 2015 for REAR VIEW DEVICE FOR A MOTOR and published as US 20150358590, which is hereby incorporated herein by reference.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for indicating to a driver of a vehicle the presence of at least one object at least temporarily moving relative to the vehicle, the method comprising the steps of: collecting data using at least one camera; analyzing the data to detect at least one hazard created by the presence of the object; calculating a descriptor representing what the object is and where the object is located relative to the vehicle; creating a warning associated with the descriptor; and displaying the hazard and the warning using at least one display device, wherein the step of displaying includes a step of enhancing the hazard displayed on the at least one display device based on the descriptor to assist the driver in recognizing the hazard, whereby enhancing the hazard displayed includes a step of marking the hazard only by graphical representation with a color and without an image representation of the detected object; and changing the color of the hazard as the object and the vehicle move relative to each other.

2. A method as set forth in claim 1 wherein the step of displaying includes the step of enhancing the hazard displayed on the at least one display device based on the descriptor to assist the driver in recognizing the hazard.

3. A method as set forth in claim 1 wherein the step of enhancing the hazard includes the step of creating audio signals to alert the driver.

4. A method as set forth in claim 1 including dividing at least one of the at least one display devices into at least two regions.

5. A method as set forth in claim 4 including the step of rectifying an image shown on one of the at least two regions.

6. A method as set forth in claim 5 including the step of presenting an image as captured by at least one camera on at least one of the other of the at least two regions.

7. A method as set forth in claim 1 wherein the step of enhancing the image includes the step of displaying an alphanumeric and/or graphical warning on at least one display device.

8. A method a set forth in claim 7, wherein the alphanumerical and/or graphical warning is displayed adjacent and/or surrounding and/or in close proximity to a spotter area.

9. A method as set forth in claim 1 wherein the step of creating a warning associated with the hazard includes additional warnings from a group of warnings consisting of odors and/or chemicals.

* * * * *